(12) United States Patent
Hagiwara

(10) Patent No.: US 12,293,562 B2
(45) Date of Patent: May 6, 2025

(54) INFORMATION PROCESSING APPARATUS AND INFORMATION PROCESSING METHOD

(71) Applicant: SOCIONEXT INC., Kanagawa (JP)

(72) Inventor: Soichi Hagiwara, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 589 days.

(21) Appl. No.: 17/411,971

(22) Filed: Aug. 25, 2021

(65) Prior Publication Data

US 2021/0383508 A1 Dec. 9, 2021

Related U.S. Application Data

(63) Continuation of application No. PCT/JP2019/007366, filed on Feb. 26, 2019.

(51) Int. Cl.
*G06V 10/44* (2022.01)
*G06T 5/00* (2024.01)
(Continued)

(52) U.S. Cl.
CPC ........... *G06V 10/44* (2022.01); *G06T 5/00* (2013.01); *G06T 5/50* (2013.01); *G06T 5/92* (2024.01); *G06T 2207/20081* (2013.01)

(58) Field of Classification Search
CPC .. G06V 10/44; G06T 5/00; G06T 5/50; G06T 5/92; G06T 2207/20081
See application file for complete search history.

(56) References Cited

U.S. PATENT DOCUMENTS

2010/0054593 A1* 3/2010 Matsushita ............... G06T 5/70
382/218
2010/0253852 A1 10/2010 Fukuda
(Continued)

FOREIGN PATENT DOCUMENTS

CN 105354823 A 2/2016
JP 2010-244360 10/2010
(Continued)

OTHER PUBLICATIONS

International Search Report issued in corresponding International Patent Application No. PCT/JP2019/007366, dated May 28, 2019, with English translation.
(Continued)

*Primary Examiner* — Nancy Bitar
*Assistant Examiner* — Dustin Bilodeau
(74) *Attorney, Agent, or Firm* — Rimon P.C.

(57) ABSTRACT

In one aspect, an information processing apparatus includes a first acquisition module, a first extraction module, a first generation module, a second extraction module, a derivation module, and a first output control module. The first acquisition module acquires an input image to output a first image and a second image. The first extraction module extracts first characteristic point information from the first image. The first generation module generates a third image obtained by reducing a data amount of the second image. The second extraction module extracts second characteristic point information from the third image. The derivation module derives a difference between the first characteristic point information and the second characteristic point information. The first output control module outputs the third image corrected in accordance with the difference as an output image.

21 Claims, 19 Drawing Sheets

(51) Int. Cl.
*G06T 5/50* (2006.01)
*G06T 5/92* (2024.01)

(56) References Cited

U.S. PATENT DOCUMENTS

| | | |
|---|---|---|
| 2011/0268328 A1 | 11/2011 | Bar-Aviv et al. |
| 2015/0015727 A1* | 1/2015 | Ryu .................. G06T 7/20 |
| | | 348/208.1 |
| 2015/0116353 A1* | 4/2015 | Miura ............... G02B 27/0075 |
| | | 345/632 |
| 2016/0035106 A1* | 2/2016 | Esaki ................. G06V 10/44 |
| | | 382/197 |
| 2018/0295260 A1 | 10/2018 | Oniki |
| 2019/0339939 A1 | 11/2019 | Ito et al. |

FOREIGN PATENT DOCUMENTS

| | | |
|---|---|---|
| JP | 2012-513816 | 6/2012 |
| JP | 2018-124681 | 8/2018 |
| JP | 2018-180733 | 11/2018 |

OTHER PUBLICATIONS

High-Efficiency Technique for Deep Learning, Technologies for Practical Application of Deep Learning, FUJITSU, 68, 5 (Sep. 2017), w/English Abstract and Translation of relevant part.

Chinese Office Action dated Jun. 19, 2024 issued in the corresponding Chinese Patent Application No. 201980092918.4, with English machine translation.

Chinese Office Action dated Dec. 18, 2024 issued in the corresponding Chinese Patent Application No. 201980092918.4, with English translation.

Chinese Office Action dated Feb. 27, 2025 issued in the corresponding Chinese Patent Application No. 201980092918.4, with English translation.

* cited by examiner

INFORMATION PROCESSING APPARATUS AND INFORMATION PROCESSING METHOD

CROSS-REFERENCE TO RELATED APPLICATIONS

This application is a continuation of International Application No. PCT/JP2019/007366, filed on Feb. 26, 2019, the entire contents of which are incorporated herein by reference.

FIELD

Embodiments described herein relate generally to an information processing apparatus and an information processing method.

BACKGROUND

For the purpose of high-speed processing, a memory amount reduction, or the like, images whose data amount is reduced have been provided conventionally. Known examples include an arithmetic device converting an image of the floating-point number format into an image of the fixed-point format and an arithmetic processing unit updating a decimal point position of fixed-point number data (e.g., see Japanese Patent Application Laid-open No. 2018-124681 and Atsushi Ike and three other people, "High-Efficiency Technique for Deep Learning," FUJITSU. 68, 5, p. 15-21 (09, 2017)).

However, there have conventionally been cases in which a partial characteristic point such as a contour of an object identifiable before a data amount reduction processing becomes lost by the data amount reduction processing. Thus, it has conventionally been difficult to provide image data with a characteristic point loss inhibited.

The present disclosure provides an information processing apparatus and an information processing method that can provide an image with a characteristic point loss inhibited.

SUMMARY

In one aspect, an information processing apparatus disclosed in this application includes: a first acquisition module configured to acquire an input image to output a first image and a second image; a first extraction module configured to extract first characteristic point information from the first image; a first generation module configured to generate a third image obtained by reducing a data amount of the second image; a second extraction module configured to extract second characteristic point information from the third image; a derivation module configured to derive a difference between the first characteristic point information and the second characteristic point information; and a first output control module configured to output the third image corrected in accordance with the difference as an output image.

DETAILED DESCRIPTION

The following describes embodiments of an information processing apparatus and an information processing method disclosed by the present application in detail with reference to the accompanying drawings. The following embodiments do not limit the disclosed technique. The embodiments can be combined with each other as appropriate within a range not causing processing details to be contradictory to each other.

First Embodiment

Figure 1:
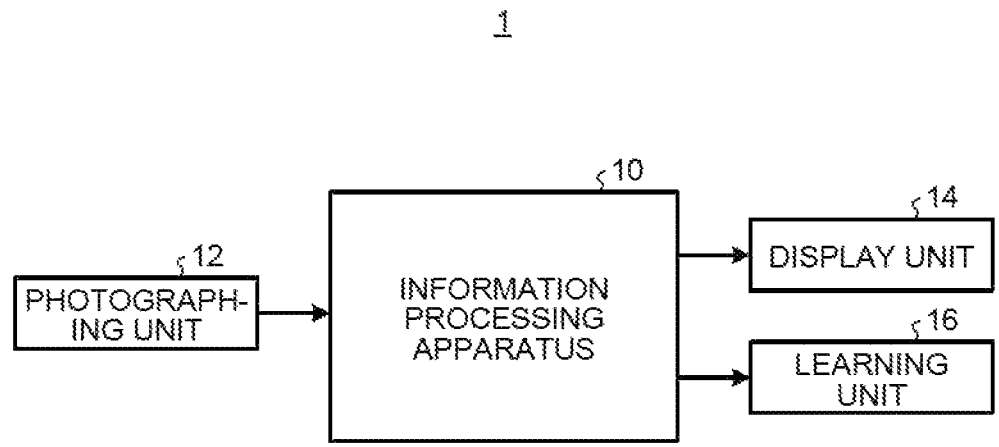
FIG. 1 is a diagram of an example of an entire configuration of an information processing system of a first embodiment.

FIG. 1 is a diagram of an example of an entire configuration of an information processing system 1 of the present embodiment. The information processing system 1 includes an information processing apparatus 10, a photographing unit 12, a display unit 14, and a learning unit 16. The photographing unit 12, the display unit 14, the learning unit 16, and the information processing apparatus 10 are connected to each other in a data-or-signal-transferrable manner.

The photographing unit 12 obtains a photographed image by photographing. The photographing unit 12 is a known image sensor, for example. In the present embodiment, the photographing unit 12 successively performs photographing and successively outputs photographed image data obtained by photographing to the information processing apparatus 10. The following description will be given with the photographed image data referred to simply as the photographed image.

The display unit 14 displays various kinds of information. The display unit 14 is a known liquid crystal display (LCD) or organic electro-luminescence (EL) display, for example.

The learning unit 16 performs processing using a learned model based on an output image received from the information processing apparatus 10 and outputs processing result information. The processing result information is information derived from the image and is correct answer information derived by the processing using the learned model, for example. Although the processing result information is information on an object included in the image, for example, this is not limiting.

The learned model is a machine learned model to generate the processing result information from the output image. The learned model is learned in advance by deep learning of a machine learning algorithm set in advance. The algorithm is a convolutional neural network (CNN), for example. The algorithm is a recurrent neural network (RNN), for example. The algorithm is a long short-term memory (LSTM), for example.

The learning unit 16 may use the output image received from the information processing apparatus 10 as teacher data for use in learning for generating the learned model.

The information processing apparatus 10 receives the photographed image from the photographing unit 12. The following description will be given with the photographed image received from the photographing unit 12 referred to as an input image. The information processing apparatus 10 executes various kinds of processing such as data amount reduction on the received input image and outputs the input image to the display unit 14 and the learning unit 16 (details will be described below). The information processing apparatus 10 outputs the input image on which the data amount reduction processing has been performed, for example, to the learning unit 16 as input to the learned model.

Figure 2:
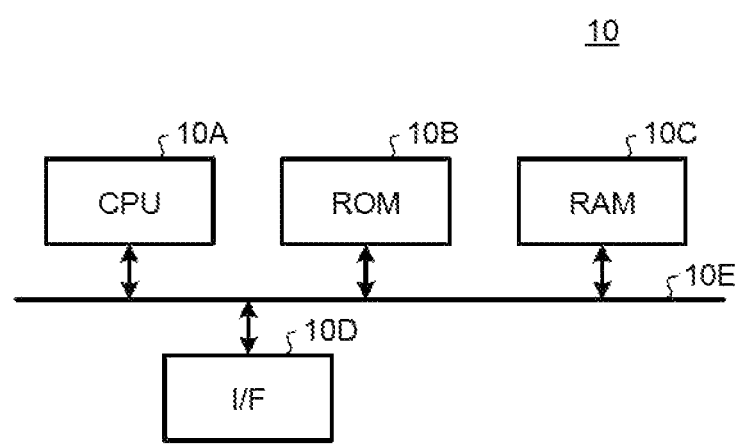
FIG. 2 is a diagram of an example of a hardware configuration of the information processing apparatus of the first embodiment.

The following describes a hardware configuration. FIG. 2 is a diagram of an example of a hardware configuration of the information processing apparatus 10.

The information processing apparatus 10 includes a central processing unit (CPU) 10A, a read only memory (ROM) 10B, a random access memory (RAM) 10C, and an interface (I/F) 10D and is a computer, for example. The CPU 10A, the ROM 10B, the RAM 10C, and the I/F 10D are connected to each other by a bus 10E and form a hardware configuration using a normal computer.

The CPU 10A is an arithmetic device controlling the information processing apparatus 10 of the present embodiment. The CPU 10A corresponds to an example of a hardware processor. The ROM 10B stores therein a computer program and the like implementing various kinds of processing by the CPU 10A. The RAM 10C stores therein data required for the various kinds of processing by the CPU 10A. The I/F 10D is an interface connecting to the photographing unit 12, the display unit 14, the learning unit 16, and the like to transmit and receive data.

A computer program for executing information processing to be executed by the information processing apparatus 10 of the present embodiment is embedded and provided in the ROM 10B, for example. The computer program to be executed by the information processing apparatus 10 of the present embodiment may be recorded and provided in a recording medium as a file of a type installable on or executable by the information processing apparatus 10. The recording medium is readable by a computer and is a compact disc read only memory (CD-ROM), a flexible disk (FD), a compact disc recordable (CD-R), a digital versatile disc (DVD), a Universal Serial Bus (USB) memory, a Secure Digital (SD) card, or the like.

Figure 3:
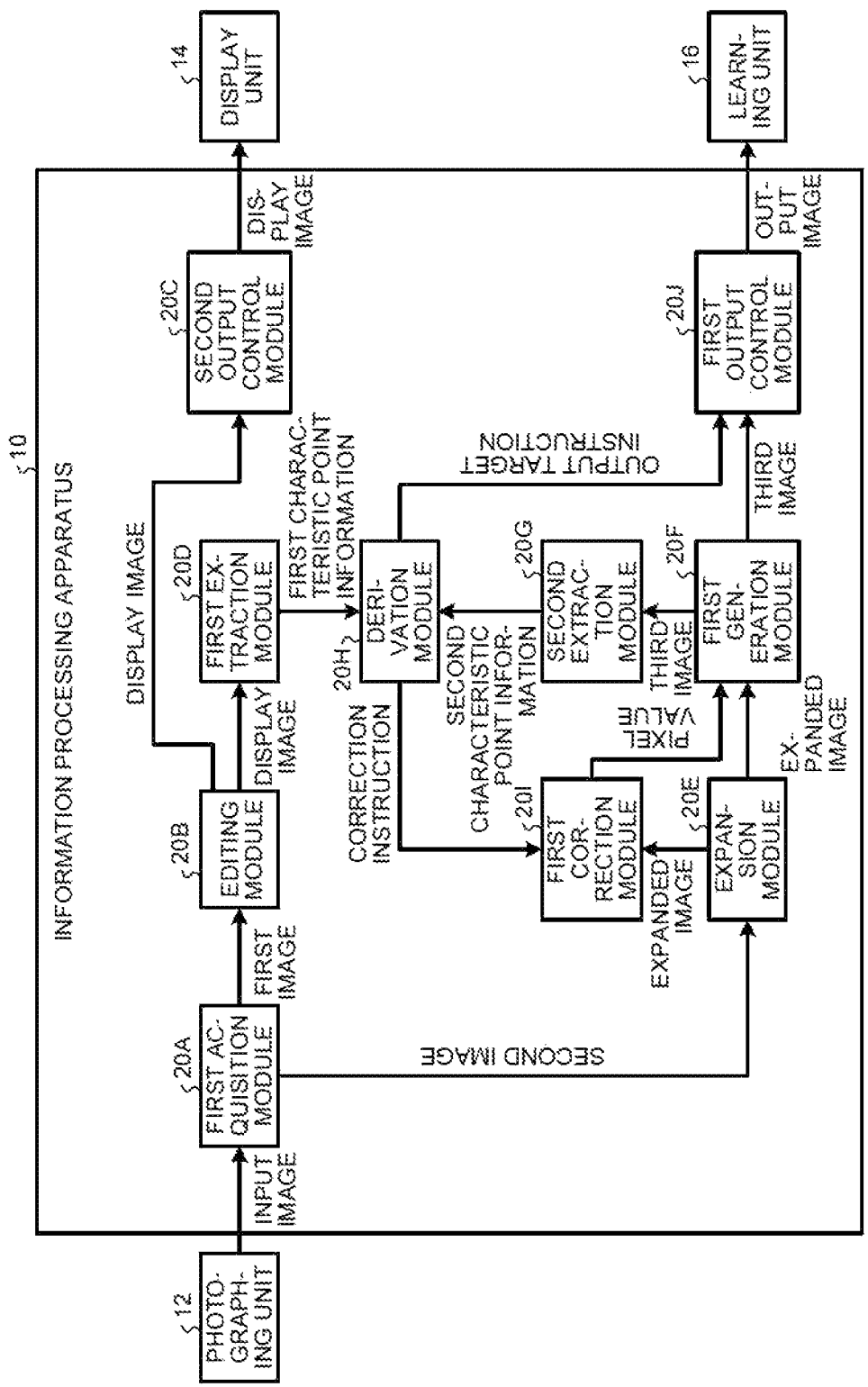
FIG. 3 is a diagram of an example of functions of the information processing apparatus of the first embodiment.

The following describes a functional configuration of the information processing apparatus 10. FIG. 3 is a diagram of an example of functions of the information processing apparatus 10. FIG. 3 also illustrates the photographing unit 12, the display unit 14, and the learning unit 16 in addition to the information processing apparatus 10 in order to clarify data input output relations.

The information processing apparatus 10 includes a first acquisition module 20A, an editing module 20B, a second output control module 20C, a first extraction module 20D, an expansion module 20E, a first generation module 20F, a second extraction module 20G, a derivation module 20H, a first correction module 20I, and a first output control module 20J.

Part or the whole of the units may be implemented by causing a processor such as the CPU 10A to execute a computer program, that is, by software, for example. Part or the whole of the units may be implemented by hardware such as an integrated circuit (IC) or be implemented by using both software and hardware.

The first acquisition module 20A acquires the input image. As described above, the first acquisition module 20A acquires the photographed image photographed by the photographing unit 12 as the input image. The first acquisition module 20A, each time the input image is acquired, outputs the acquired input image to the editing module 20B and the expansion module 20E.

In the present embodiment, the first acquisition module 20A outputs the input image to the editing module 20B as a first image. The first acquisition module 20A outputs the input image to the expansion module 20E as a second image. The first image and the second image are not limited to be the same as the input image; the first acquisition module 20A may output an image after some processing has been performed on the input image as the first image or the second image as needed. The same holds true for second to fifth embodiments below.

Figure 4A:
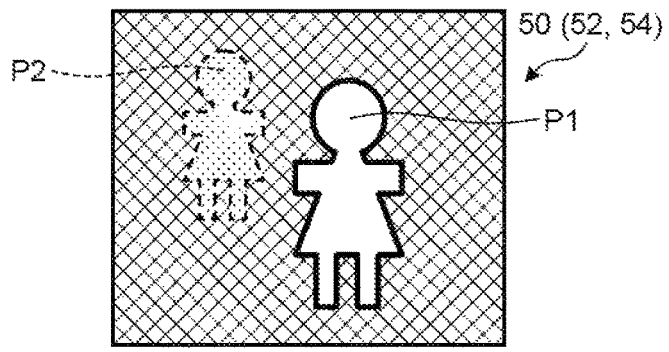
FIG. 4A is a schematic diagram of an example of an input image of the first embodiment.

FIG. 4A is a schematic diagram of an example of an input image 50. The input image 50 is an image obtained by photographing a subject. The subject is one or a plurality of objects. FIG. 4A illustrates an aspect in which the input image 50 includes an object P1 and an object P2 as an example. As illustrated in FIG. 4A, a first image 52 and a second image 54 are the same input image 50. However, the first image 52 is the input image 50 to be processed as a target to be displayed on the display unit 14. On the other hand, the second image 54 is the input image 50 to be processed as a target to be output to the learning unit 16.

Referring back to FIG. 3, the description will be continued. The editing module 20B clarifies the first image 52 received from the first acquisition module 20A. The clarification indicates processing the first image 52 for display on the display unit 14. The clarification indicates performing processing such as editing, color correction, or noise removal, on the first image 52, for example. The color correction is γ correction, for example. The editing module 20B may execute known clarification on the first image 52 so as to make the first image 52 a clear image when being displayed on the display unit 14 in accordance with the specification of the display unit 14 and the like.

Figure 4B:
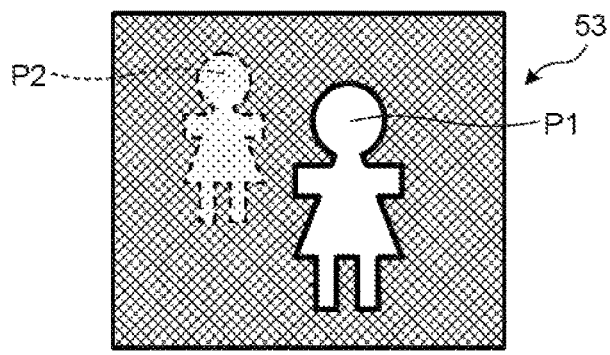
FIG. 4B is a schematic diagram of an example of a display image of the first embodiment.

The editing module 20B outputs a display image to the first extraction module 20D and the second output control module 20C. FIG. 4B is a schematic diagram of an example of a display image 53. The display image 53 is the first image 52 clarified by the editing module 20B.

Referring back to FIG. 3, the description will be continued. The second output control module 20C outputs the first image 52 to the display unit 14. In the present embodiment, the second output control module 20C outputs the display image 53 to the display unit 14. Thus, the display unit 14 displays the display image 53.

The first extraction module 20D extracts first characteristic point information from the display image 53. The first extraction module 20D may extract the first characteristic point information from the first image 52 being the input image 50.

The first characteristic point information is object-related information. The object-related information is information indicating at least a partial characteristic point of an object. Examples of the characteristic point of the object include a contour line (a boundary or an edge) of the object and a point forming the object. The contour line of the object is represented by the gradient of brightness or the like. The present embodiment describes a case in which the first characteristic point information is information indicating the contour line of the object included in the first image 52 as an example.

In the present embodiment, the first extraction module 20D extracts the first characteristic point information from the display image 53 using a high-pass filter (HPF). The high-pass filter is a known filter for use in edge extraction. The kind of a filter for use in filtering processing is a Sobel filter or a Laplacian filter, for example. The first extraction module 20D derives a change ratio of pixel value with respect to a surrounding pixel for each of a plurality of pixels forming the display image 53 using the high-pass filter. With this derivation, the first extraction module 20D extracts the first characteristic point information. That is to say, in the present embodiment, the first extraction module 20D extracts the first characteristic point information for each of the pixels forming the display image 53.

The surrounding pixel indicates at least one pixel placed adjacent to a pixel to be processed. The surrounding pixel may include one or a plurality of pixels placed adjacent to the pixel to be processed and one or a plurality of pixels arranged toward a direction departing from a position adjacent to the pixel.

The change ratio of the pixel value indicates a change ratio of brightness of a color represented by the pixel value. The pixel value represents a color element such as red (R), green (G), or blue (B) by a color value (a gray scale value of 0 to 255, for example), for example. The color value may further include a luminance value in addition to the color element. The brightness is the brightness of a color represented by the color value. The brightness indicates at least one of luminosity and luminance. In the present embodiment, the first extraction module 20D extracts the change ratio of brightness with respect to the surrounding pixel, that is, the gradient of brightness (a differential value) as the first characteristic point information for each of the pixels forming the display image 53.

The first extraction module 20D may extract the first characteristic point information from the display image 53 by a known method, and the method is not limited to the aspect using the high-pass filter.

The first extraction module 20D outputs the extracted first characteristic point information to the derivation module 20H. Specifically, the first extraction module 20D outputs the extracted first characteristic point information and identification information of the pixel from which the first characteristic point information has been extracted to the derivation module 20H successively for each pixel, for example. The identification information of the pixel is information indicating a pixel position of the pixel, for example.

The expansion module 20E receives the second image 54 from the first acquisition module 20A. The expansion module 20E expands a histogram of brightness of the second image 54. The histogram of brightness of the second image 54 indicates the distribution of the brightness of a plurality of pixels included in the second image 54 by a graph. The histogram may be referred to as a frequency distribution chart. It is assumed that pixel values of the pixels included in the second image 54 are distributed unevenly to a specific range of brightness, for example. In this case, the expansion module 20E expands the distribution of brightness to a wider range to expand the histogram of brightness of the second image 54. The expansion module 20E may expand the histogram of brightness of the second image 54 using a known method of expansion. The histogram of brightness of the second image 54 is expanded, whereby the expansion module 20E can clarify the density of the second image 54.

Figure 4C:
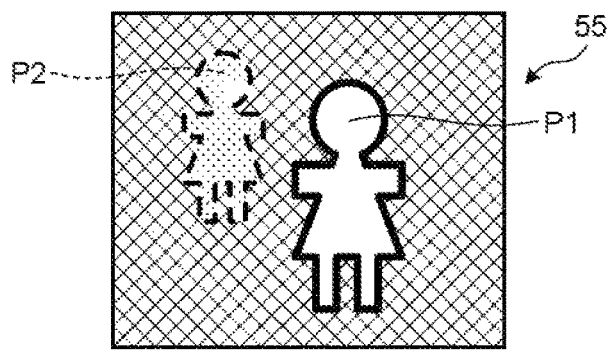
FIG. 4C is a schematic diagram of an example of an expanded image of the first embodiment.

The expansion module 20E outputs an expanded image to the first generation module 20F. FIG. 4C is a schematic diagram of an example of an expanded image 55. The expanded image 55 is an image obtained by expanding the second image 54. Referring back to FIG. 3, the description will be continued. The expansion module 20E may execute processing to optimize the second image 54 such that each of one or a plurality of objects included in the expanded image 55 is easily discriminated. For the optimization, a known image processing technique may be used. Thus, the expansion module 20E may further execute processing other than the expansion of the histogram.

The first generation module 20F reduces a data amount of the second image 54 being the input image 50 to generate a third image.

Reducing the data amount of the second image 54 indicates reducing the data amount of the second image 54 from a current data amount. Specifically, reducing the data amount of the second image 54 indicates at least one of reducing a bit depth of the second image 54 and reducing a resolution of the second image 54.

Reducing the bit depth of the second image 54 means reducing the bit depth of the second image 54 from a current bit depth. The bit depth means the number of gray scales representing the pixel value. When the bit depth is 8 bits, for example, the number of gray scales is 256. The first generation module 20F reduces the bit depth of the second image 54 from 8 bits to a bit depth less than 8 bits, for example, to generate the third image obtained by reducing the data amount of the second image 54. The first generation module 20F may reduce the bit depth of the second image 54 using a known method. A reduction rate of the bit depth may be adjusted as appropriate in accordance with required specifications of the learning unit 16 to which the output image is output or the like.

Reducing the resolution of the second image 54 means reducing the resolution of the second image 54 from a current resolution. It is assumed that the resolution of the second image 54 is 350 dpi, for example. In this case, the first generation module 20F reduces the resolution of the second image 54 to be less than 350 dpi (72 dpi, for example). The first generation module 20F may reduce the resolution of the second image 54 using a known method. A reduction rate of the resolution may be adjusted as appropriate in accordance with the required specifications of the learning unit 16 to which the output image is output or the like.

The present embodiment describes a case in which the first generation module 20F reduces the bit depth of the second image 54 to generate the third image obtained by reducing the data amount of the second image 54 as an example. The present embodiment describes an aspect in which the first generation module 20F reduces the data amount of the expanded image 55 received from the expansion module 20E to generate the third image.

In the present embodiment, the first generation module 20F reduces the data amount for each of a plurality of pixels forming the expanded image 55 to form a third image 56. The first generation module 20F outputs a pixel value of the third image 56 to the second extraction module 20G successively for each pixel.

Figure 4D:
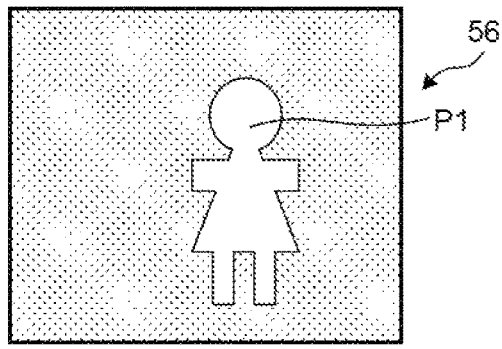
FIG. 4D is a schematic diagram of an example of a third image of the first embodiment.

FIG. 4D is a schematic diagram of an example of the third image 56. The first generation module 20F reduces the data amount of the second image 54 (refer to FIG. 4A), whereby the third image 56 is generated, for example.

With the data amount reduction processing by the first generation module 20F, a partial characteristic point such as the contour line of the object identifiable before the data amount reduction processing may become lost.

Specifically, it is assumed that among the object P1 and the object P2 (refer to FIG. 4A) identifiable in the second image 54 before the data amount reduction processing, the difference in brightness between the object P2 and a background is less than the difference in brightness between the object P1 and the background. In this case, with the data amount reduction processing on the second image 54, a partial characteristic point of the object P2 may become lost and adapt to the background in the third image 56 to become difficult to be identified (refer to FIG. 4D).

Figure 4E:
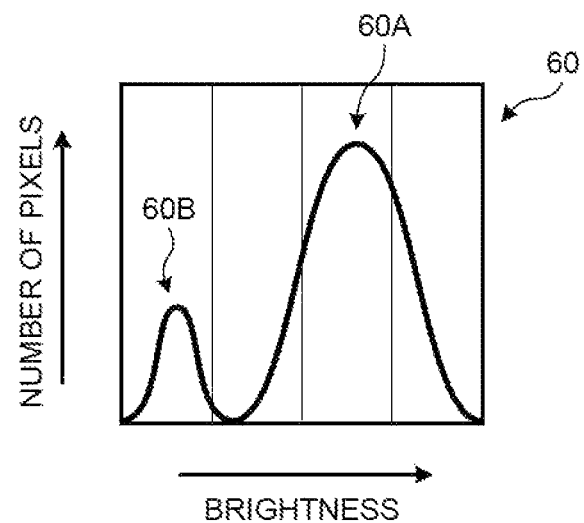
FIG. 4E is a chart of an example of a histogram of brightness of a first image of the first embodiment.
Figure 4F:
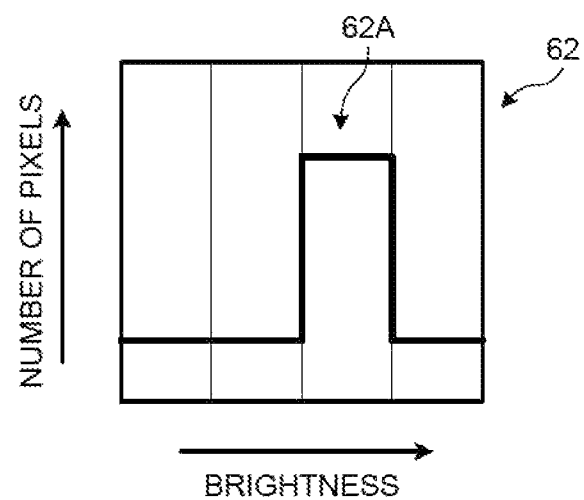
FIG. 4F is a chart of an example of a histogram of brightness of the third image of the first embodiment.

It is considered that this is because the histogram of brightness changes. FIG. 4E is a chart of an example of a histogram 60 of brightness of the first image 52. FIG. 4F is a chart of an example of a histogram 62 of brightness of the third image 56. In FIG. 4E and FIG. 4F, the vertical axis indicates the number of pixels, whereas the horizontal axis indicates brightness.

As illustrated in FIG. 4E, the histogram 60 of brightness of the first image 52 includes both a peak 60A indicating the object P1 and a peak 60B indicating the object P2. However, in the histogram 62 of brightness of the third image 56 generated by reducing the data amount, although the peak 62A indicating the object P1 is indicated, the peak indicating the object P2 disappears (refer to FIG. 4F).

When such a third image 56 is used for an apparatus executing various kinds of processing by detecting an object included in an image, processing accuracy may reduce. Examples of the apparatus executing various kinds of processing include the learning unit 16. In the learning unit 16, an image with a smaller data amount is preferably used for the processing in view of speeding-up or memory saving. However, when the third image 56 with the partial characteristic point of the object lost is used as the image to be input to the learned model of the learning unit 16 or the teacher data for use in the learning for generating the learned model, learning accuracy may reduce.

Referring back to FIG. 3, the description will be continued. Given these circumstances, in the present embodiment, the information processing apparatus 10 includes the first extraction module 20D, the second extraction module 20G, the derivation module 20H, and the first correction module 20I.

The second extraction module 20G extracts second characteristic point information from the third image 56.

The second characteristic point information is object-related information. The definitions of the object-related information and the characteristic point of the object are similar to the above. The present embodiment describes a case in which the second characteristic point information is information indicating the contour line of the object included in the third image 56 as an example.

In the present embodiment, the second extraction module 20G extracts the second characteristic point information from the third image 56 using a high-pass filter like the first extraction module 20D. The high-pass filter is similar to the high-pass filter included in the first extraction module 20D. That is to say, the second extraction module 20G derives the change ratio of the pixel value with respect to the surrounding pixel using the high-pass filter to extract the second characteristic point information for each of a plurality of pixels forming the third image 56.

Specifically, the second extraction module 20G extracts the change ratio of brightness with respect to the surrounding pixel, that is, the gradient of brightness (a differential value) as the second characteristic point information for each of the pixels forming the third image 56. The second extraction module 20G may extract the second characteristic point information from the third image 56 by a known method, and the method is not limited to the aspect using the high-pass filter.

The second extraction module 20G outputs the extracted second characteristic point information to the derivation module 20H. Specifically, the second extraction module 20G outputs the extracted second characteristic point information and the identification information of the pixel to the derivation module 20H successively for each pixel, for example. The identification information of the pixel is information indicating the pixel position of the pixel in the second image 54, for example, as described above.

The derivation module 20H derives the difference between the first characteristic point information and the second characteristic point information.

Specifically, the derivation module 20H derives the difference between a change ratio represented by the first characteristic point information and a change ratio represented by the second characteristic point information, for example.

In the present embodiment, the derivation module 20H derives the difference between the first characteristic point information and the second characteristic point information for each pixel of the third image 56 corresponding to the first image 52. Corresponding pixels indicate pixels at the same pixel position. Thus, the derivation module 20H derives the difference between the first characteristic point information and the second characteristic point information for each of a plurality of pixels forming the first image 52 and the pixels forming the third image 56 for each pixel at the same pixel position. In the present embodiment, the derivation module 20H derives the difference for each of the pixels forming the display image 53 and the pixels forming the expanded image 55 for each pixel at the same pixel position.

The derivation module 20H determines whether the derived difference is a first threshold or more for each pixel at the same pixel position. The first threshold may be a value with which whether at least part of an object included in the second image 54 (the object P1 or the object P2, for example) is lost in the third image 56 can be determined.

When the derived difference is the first threshold or more, the derivation module 20H outputs a correction instruction for the pixel value of the pixel used for the derivation of the difference among the pixels included in the third image 56 to the first correction module 20I. The correction instruction includes the pixel position of the pixel the difference of which is the first threshold or more and a signal indicating the correction of the pixel value of the pixel. That is to say, the derivation module 20H outputs a correction instruction for the pixel value of the pixel the derived difference of which is the first threshold or more in the expanded image 55 to the first correction module 20I.

On the other hand, when the derived difference is less than the first threshold, the derivation module 20H outputs an output target instruction to the first output control module 20J. The output target instruction is instruction information indicating that the pixel the difference of which is less than the first threshold among the pixels included in the third image 56 is made to be an output target. Specifically, the output target instruction includes the pixel position of the pixel the difference of which is less than the first threshold and a signal indicating that the pixel is made to be the output target, for example.

The first correction module 20I corrects the second image 54 in accordance with the difference derived by the derivation module 20H. In the present embodiment, the first correction module 20I corrects the expanded image 55 in accordance with the difference.

Specifically, the first correction module 20I receives the correction instruction for the pixel value of the pixel, the difference of which is the first threshold or more, from the derivation module 20H, for example. The first correction module 20I corrects the pixel value of the pixel the difference of which is the first threshold or more among the pixels included in the expanded image 55.

Figure 5A:
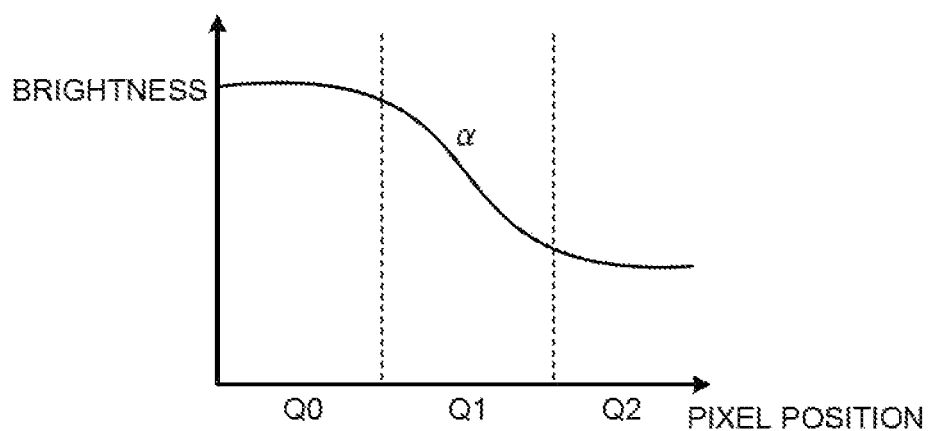
FIG. 5A is an illustrative diagram of correction of a pixel value of the first embodiment.
Figure 5B:
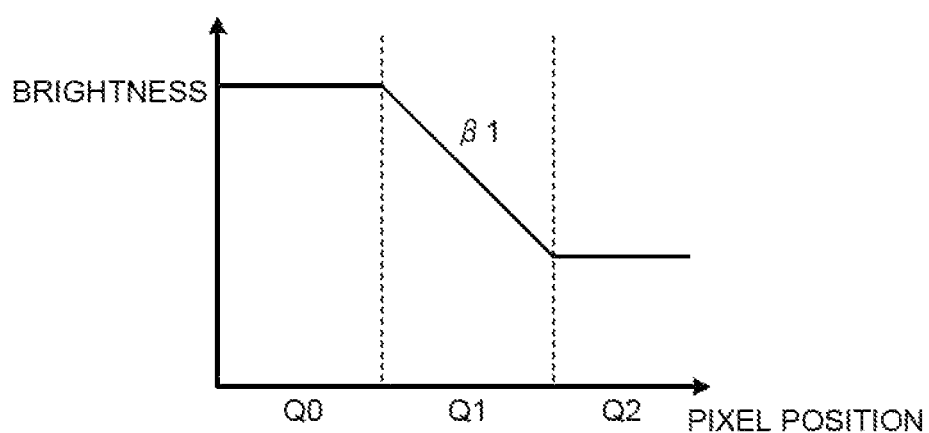
FIG. 5B is an illustrative diagram of correction of the pixel value of the first embodiment.
Figure 5C:
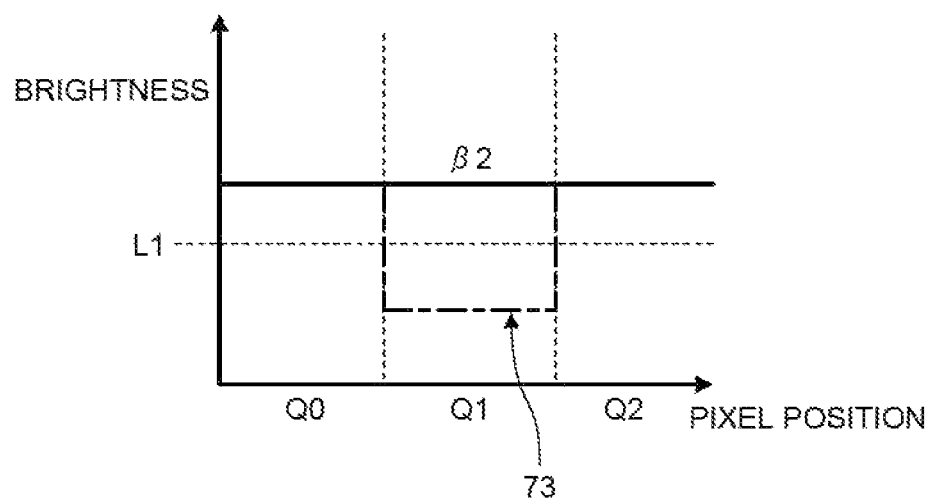
FIG. 5C is an illustrative diagram of correction of the pixel value of the first embodiment.
Figure 5D:
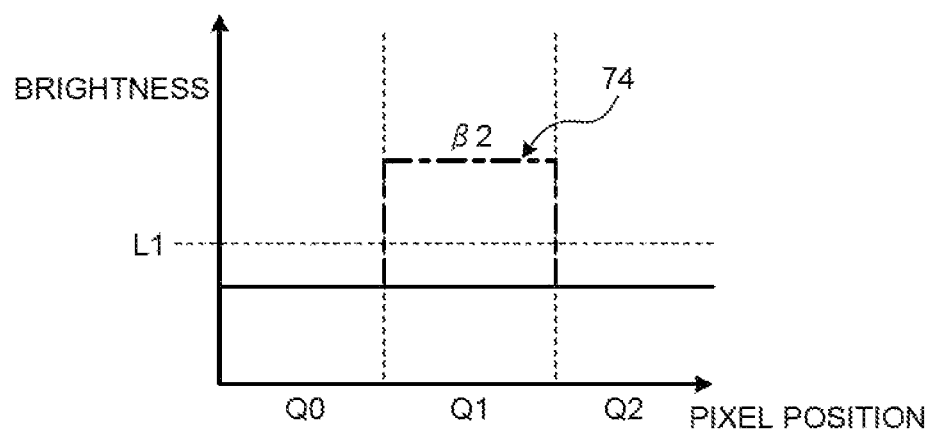
FIG. 5D is an illustrative diagram of correction of the pixel value of the first embodiment.

FIG. 5A, FIG. 5B, FIG. 5C, and FIG. 5D are illustrative diagrams of correction of the pixel value by the first correction module 20I. FIG. 5A is a chart of an example of the first characteristic point information of pixels of the display image 53. FIG. 5B is a chart of an example of the second characteristic point information of pixels of the third image 56. FIG. 5C is a chart of an example of the second characteristic point information of the pixels of the third image 56. FIG. 5D is a chart of an example of the second characteristic point information of the pixels of the third image 56.

In FIG. 5A, FIG. 5B, FIG. 5C, and FIG. 5D, the horizontal axis indicates a pixel position, whereas the vertical axis indicates brightness represented by the pixel value. It is assumed that a pixel position Q0, a pixel position Q1, and a pixel position Q2 indicate respective positions of three pixels arranged adjacent to each other.

As illustrated in FIG. 5A, it is assumed that in the display image 53 the change ratio of brightness serving as the first characteristic point information of the pixel at the pixel position Q1 is a change ratio α, for example. As illustrated in FIG. 5B, it is assumed that in the third image 56 the change ratio of brightness serving as the second characteristic point information of the pixel at the pixel position Q1 is a change ratio β1. It is assumed that the difference between the change ratio α and the change ratio β1 is less than the first threshold. In this case, the first correction module 20I does not perform correction of the pixel value of the pixel at the pixel position Q1 in the expanded image 55.

As illustrated in FIG. 5C and FIG. 5D, it is assumed that in the image of the third image 56 the change ratio of brightness serving as the second characteristic point information of the pixel at the pixel position Q1 is a change ratio β2. It is assumed that the difference between the change ratio β2 and the change ratio α is the first threshold or more. In this case, the first correction module 20I corrects the pixel value of the pixel at the pixel position Q1 in the expanded image 55.

As illustrated in FIG. 5C, it is assumed that the brightness indicated by the pixel value at the pixel position Q1 in the expanded image 55 is a first brightness L1 or more, for example. In this case, the first correction module 20I corrects the brightness indicated by the pixel value of the pixel at the pixel position Q1 in the expanded image 55 to be less than the first brightness L1 (refer to the chart 73 in FIG. 5C). The first brightness L1 may be set in advance. For the first brightness L1, an intermediate brightness between a minimum brightness and a maximum brightness that the pixel value can take (a 50% brightness, for example) may be set in advance, for example.

On the other hand, as illustrated in FIG. 5D, it is assumed that the brightness indicated by the pixel value at the pixel position Q1 in the expanded image 55 is less than the first brightness L1. In this case, the first correction module 20I corrects the brightness indicated by the pixel value of the pixel at the pixel position Q1 in the expanded image 55 to a brightness of the first brightness L1 or more (refer to the chart 74 in FIG. 5D).

The correction is performed, whereby the first correction module 20I corrects the pixel value of the pixel for which the difference between the first characteristic point information and the second characteristic point information has been determined to be the first threshold or more by the derivation module 20H in the expanded image 55 such that the difference becomes smaller. In other words, the first correction module 20I corrects the pixel value of the pixel for which the difference has been determined to be the first threshold or more such that the change ratio of brightness becomes larger than the current one, that is, such that the contour line of the object is caused to appear or emphasized.

As described above, the first threshold is a value with which whether at least part of the object included in the display image 53 (the object P1 or the object P2, for example) is lost in the third image 56 can be determined. Thus, the first correction module 20I can correct a pixel value of an area for which at least part of the characteristic point indicating the object has been determined to become lost by the data amount reduction processing in the expanded image 55 to a pixel value with which the object can be determined. The first correction module 20I may use the second image 54 in place of the expanded image 55 for the image for use in the determination of brightness.

Referring back to FIG. 3, the description will be continued. The first correction module 20I outputs the pixel value of the corrected pixel to the first generation module 20F. The first generation module 20F reduces the data amount of the corrected pixel in like manner with the above and outputs the corrected pixel to the second extraction module 20G. The second extraction module 20G extracts the second characteristic point information from the pixel corrected by the first correction module 20I and the data amount of which has been reduced by the first generation module 20F. The derivation module 20H derives the difference between the second characteristic point information and the first characteristic point information of a pixel at a corresponding pixel position in the display image 53 (or the first image 52). The derivation module 20H repeats the processing to output the correction instruction for the pixel value to the first correction module 20I for the pixel at the pixel position in the expanded image 55 until determining that this difference is less than the first threshold.

Thus, the information processing apparatus 10 of the present embodiment repeatedly executes the correction by the first correction module 20I until it is determined that the difference between the first characteristic point information and the second characteristic point information is less than the first threshold for all the pixels forming the third image 56.

Thus, with the processing by the derivation module 20H, the first correction module 20I, the first generation module 20F, and the second extraction module 20G, the pixel values of all the pixels forming the third image 56 are adjusted such that the difference becomes less than the first threshold.

The first correction module 20I may correct the third image 56 in accordance with the difference between the first characteristic point information and the second characteristic point information. That is to say, the first correction module 20I may correct the second image 54, the expanded image 55, or the third image 56.

When the first correction module 20I corrects the third image 56 in accordance with the difference, the following processing may be executed. In this case, when the derived difference is the first threshold or more, the derivation module 20H outputs the correction instruction to the first correction module 20I. This correction instruction is instruction information indicating correction for the pixel value of the pixel used for the derivation of the difference among the pixels included in the third image 56. That is to say, the derivation module 20H may output the correction instruction for the pixel value of the pixel the difference of which is the first threshold or more in the third image 56 to the first correction module 20I.

The first correction module 20I corrects the pixel value of the pixel at the pixel position for which the correction instruction has been performed in the third image 56 in accordance with the difference derived by the derivation module 20H. That is to say, the first correction module 20I corrects the pixel value of the pixel the difference of which is the first threshold or more among the pixels included in the third image 56. The first correction module 20I may perform correction of the pixel value in accordance with whether the brightness indicated by the pixel value of the third image 56 is the first brightness L1 or more in like manner with the correction of the expanded image 55.

The following describes the first output control module 20J. The first output control module 20J holds the pixel value of the pixel at the pixel position indicated by the output target instruction in the third image 56 as an output target and outputs the output image to the learning unit 16.

The output image is the third image 56 corrected in accordance with the difference between the first characteristic point information and the second characteristic point information. That is to say, the output image is the third image 56 including the pixel the difference between the first characteristic point information and the second characteristic point information of which is less than the first threshold.

When receiving the output target instruction for all the pixels forming the third image 56, for example, the first output control module 20J outputs the output image to the learning unit 16.

Figure 6:
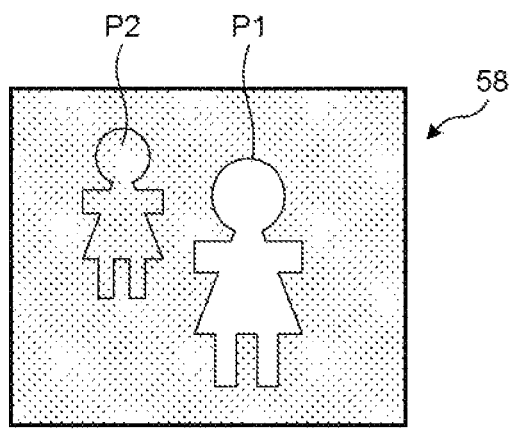
FIG. 6 is a schematic diagram of an example of an output image of the first embodiment.

FIG. 6 is a schematic diagram of an example of an output image 58. FIG. 6 illustrates an example of the output image 58 generated by the information processing apparatus 10 using the input image 50 illustrated in FIG. 4A. As illustrated in FIG. 6, the output image 58 includes the object P2 lost from the input image 50 in the third image 56 illustrated in FIG. 4D (refer to FIG. 4D).

As described above, the first correction module 20I corrects the pixel value of the pixel the difference between the first characteristic point information and the second characteristic point information of which is the first threshold or more among the pixels forming the second image 54 or the expanded image 55 such that the change ratio of brightness becomes larger than the current change ratio. Thus, the output image 58 is an image obtained by correcting the third image 56 such that the contour line of the object at least part of which has disappeared by the data amount reduction processing is caused to appear or emphasized. In other words, the output image 58 is an image obtained by correcting the third image 56 with a reduced data amount such that the object P2 that has become lost by the data amount reduction processing is restored. Thus, the first output control module 20J can output the output image 58, which is an image with a characteristic point loss inhibited and with a reduced data amount, to the learning unit 16.

Figure 7:
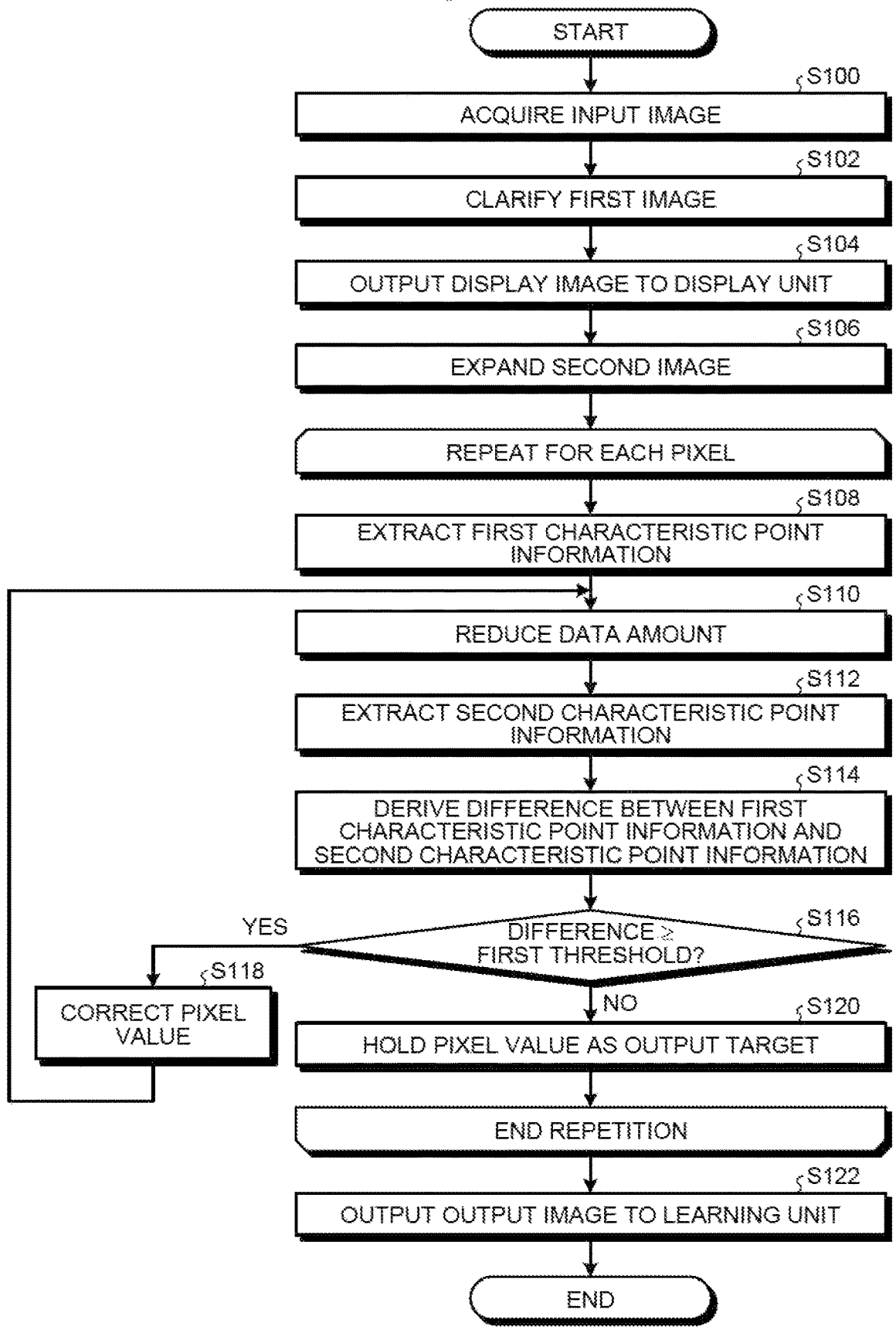
FIG. 7 is a flowchart of an example of information processing executed by the information processing apparatus of the first embodiment.

The following describes an example of a procedure of information processing executed by the information processing apparatus 10 of the present embodiment. FIG. 7 is a flowchart of an example of the information processing executed by the information processing apparatus 10 of the present embodiment. The order of a plurality of steps can be changed as appropriate and is not limited to the example in FIG. 7. At least partial steps of the steps may be executed in parallel.

The first acquisition module 20A acquires the input image 50 from the photographing unit 12 (Step S100). The first acquisition module 20A outputs the acquired input image 50 to the editing module 20B as the first image 52 and outputs the input image 50 to the expansion module 20E as the second image 54.

The editing module 20B clarifies the first image 52 received from the first acquisition module 20A (Step S102). With the processing at Step S102, the display image 53 is generated. The second output control module 20C outputs the display image 53 generated at Step S102 to the display unit 14 (Step S104).

The expansion module 20E expands the histogram of brightness of the second image 54 received from the first acquisition module 20A (Step S106). With the processing at Step S106, the expanded image 55 is generated.

The first extraction module 20D, the expansion module 20E, the first generation module 20F, the second extraction module 20G, the derivation module 20H, and the first correction module 20I repeat the processing at Step S108 to Step S120 for each pixel of the input image 50 (the first image 52 and the second image 54) acquired at Step S100.

Specifically, the first extraction module 20D extracts the first characteristic point information from the pixel to be processed in the display image 53 generated at Step S102 (Step S108). The first extraction module 20D may successively extract one pixel on which the processing at Step S108 to Step S120 has not been performed among the pixels forming the display image 53 as the pixel to be processed.

The first generation module 20F reduces the data amount for the pixel at the pixel position to be processed at Step S108 included in the expanded image 55 generated at Step S106 to generate the third image 56 (Step S110). The second extraction module 20G extracts the second characteristic point information from the pixel the data amount of which has been reduced at Step S110 (Step S112).

The derivation module 20H derives the difference between the first characteristic point information extracted at Step S108 and the second characteristic point information extracted at Step S112 (Step S114). The derivation module 20H determines whether the difference derived at Step S114 is the first threshold or more (Step S116).

When the difference derived at Step S114 is the first threshold or more (Yes at Step S116), the derivation module 20H outputs a correction instruction for the pixel value of the pixel at the pixel position to be processed at Step S108 to the first correction module 20I. The first correction module 20I having received the correction instruction corrects the pixel value of the pixel at the pixel position indicated by the correction instruction in the expanded image 55 generated at Step S106 in accordance with the difference (Step S118). The first correction module 20I outputs the pixel value of the corrected pixel to the first generation module 20F, and the process returns to Step S110. At Step S110, the first generation module 20F reduces the data amount of the corrected pixel, and the above processing is repeated.

On the other hand, when the difference derived at Step S114 is less than the first threshold (No at Step S116), the derivation module 20H outputs an output target instruction setting the pixel at the pixel position to be processed at Step S108 among the pixels included in the third image 56 as an output target to the first output control module 20J. The first output control module 20J holds the pixel value of the pixel at the pixel position indicated in the output target instruction in the third image 56 as an output target (Step S120).

Upon end of the processing at Step S108 to Step S120 for all the pixels of the input image 50 (the first image 52 and the second image 54) acquired at Step S100, the process advances to Step S122. At Step S122, the first output control module 20J outputs the output image 58 being the third image 56 including a plurality of pixels the difference between the first characteristic point information and the second characteristic point information of which is less than the first threshold to the learning unit 16 (Step S122). Then, the present routine ends.

As described in the foregoing, the information processing apparatus 10 of the present embodiment includes the first acquisition module 20A, the first extraction module 20D, the first generation module 20F, the second extraction module 20G, the derivation module 20H, the first output control module 20J, and the first correction module 20I. The first acquisition module 20A acquires the input image 50 and outputs the first image 52 and the second image 54. The first extraction module 20D extracts the first characteristic point information from the first image 52. The first generation module 20F generates the third image 56 obtained by reducing the data amount of the second image 54. The second extraction module 20G extracts the second characteristic point information from the third image 56. The derivation module 20H derives the difference between the first characteristic point information and the second characteristic point information. The first output control module 20J outputs the third image 56 corrected in accordance with the difference as the output image 58.

With the data amount reduction processing by the first generation module 20F, a partial characteristic point such as the contour line of the object identifiable before the data amount reduction processing may become lost.

On the other hand, in the present embodiment, when the derived difference is the first threshold or more, the first correction module 20I corrects the second image 54. The first output control module 20J outputs, as the output image 58, the third image 56 being the input image 50 with a reduced data amount and corrected in accordance with the derived difference.

The first correction module 20I corrects the second image 54 such that the change ratio of brightness becomes larger than the current change ratio in accordance with the difference between the first characteristic point information and the second characteristic point information, whereas the first output control module 20J outputs the corrected third image 56 as the output image 58, for example. Thus, the output image 58 is an image obtained by correcting the third image 56 such that the contour line of the object at least part of which has disappeared by the data amount reduction processing is caused to appear or emphasized. In other words, the output image 58 is an image obtained by correcting the third image 56 such that the object that has become lost by the data amount reduction processing is restored. Thus, the first output control module 20J can output the output image 58 that is an image with the characteristic point loss inhibited and with a reduced data amount.

Consequently, the information processing apparatus 10 of the present embodiment can provide an image with the characteristic point loss inhibited.

The first output control module 20J outputs the output image 58 to the learning unit 16. The learning unit 16 uses the output image 58 as at least one of the input image to be input to the learned model and the teacher data for use in the learning for generating the learned model. Thus, the learning unit 16 can improve processing accuracy or learning accuracy. That is to say, the information processing apparatus 10 of the present embodiment can provide the output image 58 that can improve the processing accuracy of learning or learning accuracy in addition to the above effect.

Second Embodiment

In the first embodiment, the input image 50 is acquired to be used for the information processing. The present embodiment describes an aspect in which the input image 50 and distance information are acquired to be used for information processing.

In the present embodiment and the following embodiments, parts having the same function and configuration as those of the first embodiment are given the same symbols, and detailed descriptions thereof are omitted.

Figure 8:
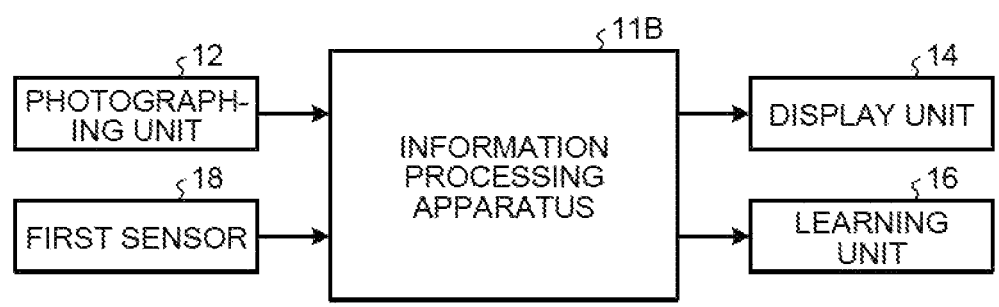
FIG. 8 is a diagram of an example of an entire configuration of an information processing system of a second embodiment.

FIG. 8 is a diagram of an example of an entire configuration of an information processing system 1B of the present embodiment. The information processing system 1B includes an information processing apparatus 11B, the photographing unit 12, the display unit 14, the learning unit 16, and a first sensor 18. The photographing unit 12, the display unit 14, the learning unit 16, and the first sensor 18 and the information processing apparatus 11B are connected to each other in a data-or-signal-transferrable manner. The photographing unit 12, the display unit 14, and the learning unit 16 are similar to those of the first embodiment.

The first sensor 18 obtains a first distance image specifying distance information from the first sensor 18 of each of a plurality of detection points included in a photographing environment of the input image 50.

The photographing environment is an environment when the photographing unit 12 photographs the input image 50.

A detection point indicates each of a plurality of points individually observed by the first sensor 18 in the photographing environment outside the first sensor 18. The first sensor 18 applies light to the area around the first sensor 18 and receives reflected light reflected by a reflection point, for example. This reflection point corresponds to the detection point. A plurality of reflection points may be used as one detection point.

The first distance image is an image specifying the distance information indicating the distance from the first sensor 18 of each of the detection points included in the photographing environment. The first distance image is an image specifying the distance information for each detection point corresponding to each of a plurality of pixels included in the input image 50, for example.

The first sensor 18 obtains observation information including an application direction of light to each of the detection points (a direction of the detection point based on the first sensor 18) and information on the reflected light reflected by each of the detection points, for example. The information on the reflected light is an elapsed time from the application of light to the reception of the reflected light, the intensity of received light, an attenuation rate of the intensity of the received light with respect to the intensity of emitted light, or the like, for example. The first sensor 18 calculates the distance information for each detection point using the elapsed time or the intensity.

The first sensor 18 specifies the calculated distance information as the distance information of the detection point corresponding to each of the pixels included in the input image 50 to form the first distance image and outputs the first distance image to the information processing apparatus 11B. The calculation of the distance information may be executed by the information processing apparatus 11B. The present embodiment describes a case in which a resolution represented by the density of the detection points forming the first distance image matches a resolution represented by the density of the pixels of the input image 50 as an example. The resolution represented by the density of the detection points forming the first distance image does not necessarily match the resolution represented by the density of the pixels of the input image 50.

The first sensor 18 is a distance sensor. The distance sensor is a millimeter wave sensor or a laser sensor, for example. The laser sensor is a two-dimensional laser imaging detection and ranging (LiDAR) sensor or a three-dimensional LiDAR sensor placed parallel to a horizontal plane, for example. The present embodiment describes an aspect in which LiDAR of a time-of-flight (ToF) system deriving a distance from a period of time between application of a laser and the return of reflected light is used. The first sensor 18 may be a photographing apparatus obtaining a depth map specifying the distance from the first sensor 18 for each pixel.

The information processing apparatus 11B receives the input image 50 from the photographing unit 12. The information processing apparatus 11B receives the first distance image from the first sensor 18. It is assumed that the information processing apparatus 11B receives the input image 50 and the first distance image obtained at the same time. That is to say, the information processing apparatus 11B receives the input image 50 and the first distance image of the same photographing environment. The information processing apparatus 11B executes the information processing using the received input image 50 and first distance image. The hardware configuration of the information processing apparatus 11B is similar to that of the information processing apparatus 10.

Figure 9:
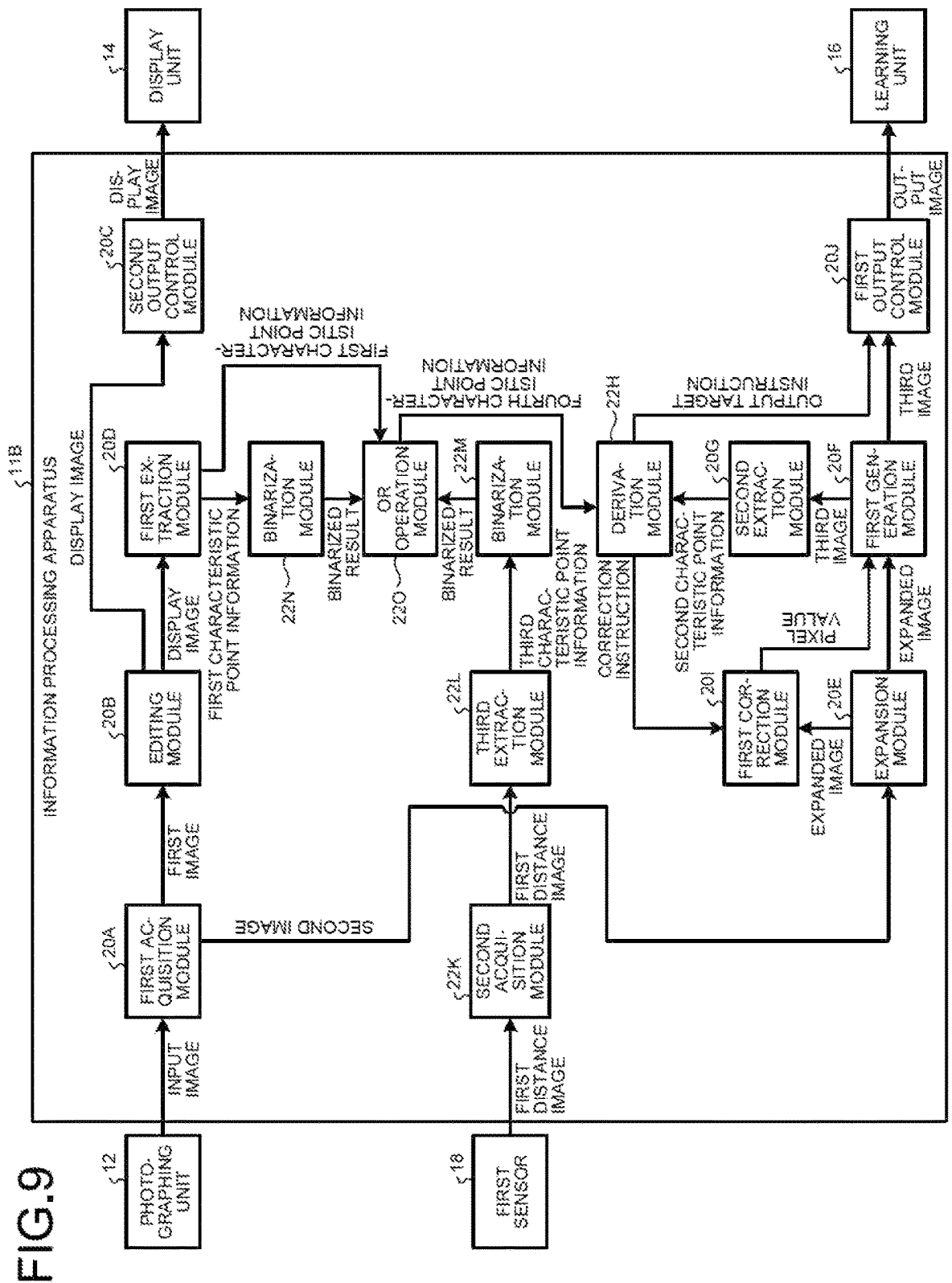
FIG. 9 is a diagram of an example of functions of an information processing apparatus of the second embodiment.

FIG. 9 is a diagram of an example of functions of the information processing apparatus 11B.

The information processing apparatus 11B includes the first acquisition module 20A, the editing module 20B, the second output control module 20C, the first extraction module 20D, the expansion module 20E, the first generation module 20F, the second extraction module 20G, a derivation module 22H, and the first correction module 20I. The information processing apparatus 11B includes the first output control module 20J, a second acquisition module 22K, a third extraction module 22L, a binarization module 22M, a binarization module 22N, and an OR operation module 22O.

Part or the whole of the units may be implemented by causing a processor such as the CPU 10A to execute a computer program, for example, that is, by software. Part or the whole of the units may be implemented by hardware such as an integrated circuit (IC) or be implemented by using both software and hardware.

That is to say, the information processing apparatus 11B of the present embodiment includes the derivation module 22H in place of the derivation module 20H of the first embodiment. The information processing apparatus 11B further includes the second acquisition module 22K, the third extraction module 22L, the binarization module 22M, the binarization module 22N, and the OR operation module 22O in addition to the functions of the information processing apparatus 10 of the first embodiment.

The second acquisition module 22K acquires the first distance image from the first sensor 18.

The third extraction module 22L extracts third characteristic point information from the first distance image. The third characteristic point information is information indicating at least a partial characteristic point of the object included in the first distance image. The characteristic point is similar to that of the first embodiment. The present embodiment describes a case in which the third characteristic point information is information indicating the contour line (the boundary or the edge) of the object included in the first distance image as an example.

In the present embodiment, the third extraction module 22L extracts the third characteristic point information from the first distance image using a high-pass filter. The high-pass filter is similar to the high-pass filter included in the first extraction module 20D. That is to say, the third extraction module 22L derives a change ratio of the distance information with respect to a surrounding detection point for each of the detection points forming the first distance image using the high-pass filter to extract the third characteristic point information. That is to say, in the present embodiment, the third extraction module 22L extracts the third characteristic point information for each detection point forming the first distance image.

The surrounding detection point indicates at least another detection point placed adjacent to the detection point to be processed. The surrounding detection point may include other detection points placed adjacent to the detection point to be processed and one or a plurality of other detection points arranged toward a direction departing from a position adjacent to the detection point.

The change ratio of the distance information indicates a change ratio of a distance represented by the distance information. Thus, in the present embodiment, the third extraction module 22L extracts the change ratio of the distance information with respect to the surrounding detection point, that is, the gradient of distance (a differential value) as the third characteristic point information for each detection point of the first distance image.

The third extraction module 22L may extract the third characteristic point information included in the first distance image by a known method, and the method is not limited to the aspect using the high-pass filter.

There is a high possibility that there is an important boundary around the detection point the change ratio with respect to the surrounding detection point of which is large among the detection points included in the first distance image. Thus, the third extraction module 22L preferably multiplies filtering processing using a plurality of kinds of filters to extract the third characteristic point information. The filtering processing is multiplied, whereby the third characteristic point information can be extracted more accurately.

The binarization module 22M binarizes the third characteristic point information. The binarization module 22M derives a binarized result "1" (true) when the third characteristic point information is a preset second threshold or more and derives a binarized result "0" (false) when the third characteristic point information is less than the second threshold.

For the second threshold, a threshold for determining whether the information is information indicating the contour line or the boundary of the object may be set in advance.

The binarization module 22M outputs the binarized result to the OR operation module 22O. Specifically, the binarization module 22M outputs the binarized result of the third characteristic point information and identification information of the detection point indicating the third characteristic point information to the OR operation module 22O, for example. The identification information of the detection point is information indicating a position in the first distance image, for example.

The first extraction module 20D derives the change ratio of the pixel value with respect to the surrounding pixel to extract the first characteristic point information for each of the pixels forming the display image 53 like the first embodiment. The first extraction module 20D outputs the extracted first characteristic point information and the identification information of the pixel from which the first characteristic point information has been extracted to the derivation module 22H successively for each pixel like the first embodiment.

In the present embodiment, the first extraction module 20D further outputs the extracted first characteristic point information and the identification information of the pixel from which the first characteristic point information has been extracted to the binarization module 22N for each pixel.

The binarization module 22N binarizes the first characteristic point information extracted by the first extraction module 20D. The binarization module 22N derives a binarized result "1" (true) when the first characteristic point information is a preset third threshold or more and derives a binarized result "0" (false) when the first characteristic point information is less than the third threshold.

For the third threshold, a threshold for determining whether the information is information indicating the contour line or the boundary of the object may be set in advance like the second threshold.

The binarization module 22N outputs the binarized result to the OR operation module 22O. Specifically, the binarization module 22N outputs the binarized result of the first characteristic point information and the identification information of the pixel indicating the first characteristic point information to the OR operation module 22O, for example. The identification information of the pixel is information indicating the pixel position in the first image 52 as described above.

The OR operation module 22O performs an OR operation of the first characteristic point information and the third characteristic point information. Specifically, the OR operation module 22O performs an OR operation of the binarized result of the first characteristic point information by the binarization module 22N and the binarized result of the third characteristic point information by the binarization module 22M, for example. In the present specification, performing an OR operation includes binarizing input information and performing an OR operation on the binarized result in addition to performing an OR operation on binarized information. The same holds true for third to fifth embodiments below. Thus, although FIG. 9 illustrates the OR operation module 22O, the binarization module 22N, and the binarization module 22M as independent functional units, the OR operation module 22O can also include therein the functions of the binarization module 22N and the binarization module 22M.

In this case, the OR operation module 22O, for each of the pixels forming the first image 52, performs an OR operation of the binarized result of the first characteristic point information and the binarized result of the third characteristic point information of the detection point at a position corresponding to each pixel. A corresponding position indicates that the positions in the images are the same position. Specifically, the corresponding position indicates that the positions in the real space are the same. Thus, the OR operation module 22O performs an OR operation for each pair of a pixel and a detection point at the same position for each of the pixels forming the first image 52 and the detection points included in the first distance image.

The OR operation module 22O derives "1" when at least one of the binarized result of the first characteristic point information by the binarization module 22N and the binarized result of the third characteristic point information by the binarization module 22M is "1." The OR operation module 22O derives "0" when both the binarized result of the first characteristic point information by the binarization module 22N and the binarized result of the third characteristic point information by the binarization module 22M are "0."

The OR operation module 22O uses the first characteristic point information as fourth characteristic point information for a pixel the result of the OR operation of which is "1" (true) based on the result of the OR operation and the binarized result of the first characteristic point information of which is "1." On the other hand, the OR operation module 22O uses first correction information in place of the first characteristic point information as the fourth characteristic point information for a pixel the result of the OR operation of which is "1" (true) based on the result of the OR operation and the binarized result of the first characteristic point information of which is "0." The first correction information may be a value of the third threshold or more and can be a preset fixed value of the third threshold or more, for example. The OR operation module 22O uses the first characteristic point information as the fourth characteristic point information for a pixel the result of the OR operation of which is "0" (false) based on the result of the OR operation.

Thus, the OR operation module 22O can obtain information in which the characteristic point of the object identified from the first distance image is added to the display image 53 based on the result of the OR operation. That is to say, the OR operation module 22O can add information indicating the characteristic point extracted from the first distance image to a pixel not including information indicating the characteristic point of the object in the display image 53.

Specifically, the OR operation module 22O corrects the first characteristic point information based on the result of performing the OR operation and can thereby generate the fourth characteristic point information. That is to say, the OR operation module 22O can set the fourth characteristic point information indicating a change amount larger than a change amount included in the first characteristic point information based on the third characteristic point information extracted from the first distance image for the pixel not including the information indicating the characteristic point of the object in the display image 53.

The OR operation module 22O outputs the fourth characteristic point information generated based on the result of the OR operation for each of the pixels forming the display image 53 and the identification information of the pixel to the derivation module 22H successively for each pixel.

The derivation module 22H derives the difference between the fourth characteristic point information received from the OR operation module 22O and the second characteristic point information for each pixel of the third image 56 corresponding to the first image 52.

The derivation module 22H determines whether the derived difference is the first threshold or more like the derivation module 20H of the first embodiment. When the derived difference is the first threshold or more, the derivation module 22H outputs a correction instruction for the pixel value of the pixel used for the derivation of the difference among the pixels included in the third image 56 to the first correction module 20I. On the other hand, when the derived difference is less than the first threshold, the derivation module 22H outputs an output target instruction setting the pixel at the pixel position used for the derivation of the difference among the pixels included in the third image 56 as an output target to the first output control module 20J.

Thus, in the present embodiment, the derivation module 22H derives the difference between the fourth characteristic point information generated by correcting the first characteristic point information based on the result of performing the OR operation of the first characteristic point information and the third characteristic point information and the second characteristic point information extracted from the third image 56. Like the first embodiment, the first correction module 20I corrects the expanded image 55 in accordance with the difference. The first output control module 20J outputs, to the learning unit 16 as the output image 58, the third image 56 obtained by reducing the data amount of the second image 54, the second image 54 being corrected by the first correction module 20I in accordance with the difference.

The first correction module 20I may correct the third image 56 in accordance with the derived difference like the first embodiment.

Figure 10:
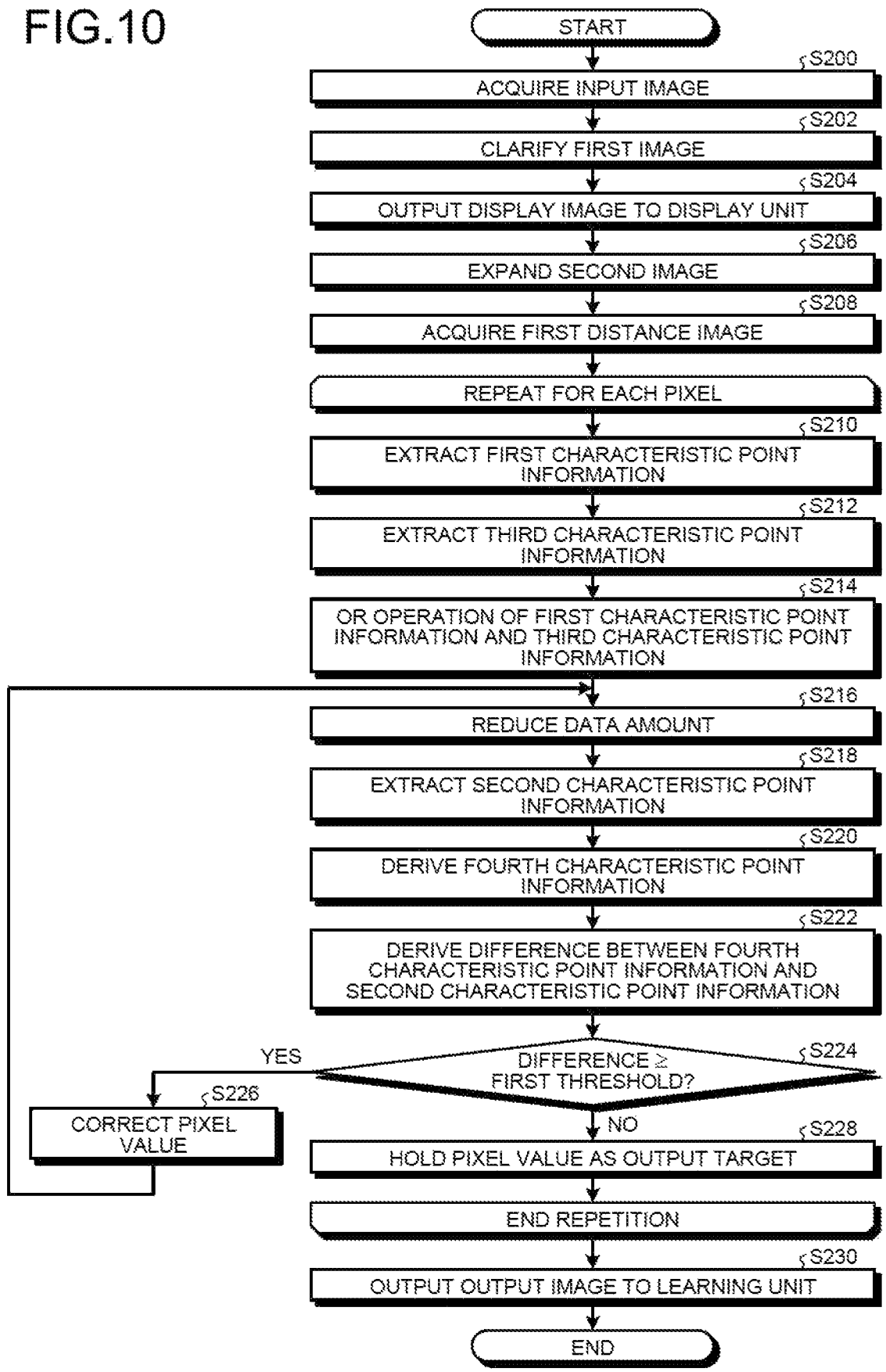
FIG. 10 is a flowchart of an example of information processing executed by the information processing apparatus of the second embodiment.

The following describes an example of a procedure of information processing executed by the information processing apparatus 11B of the present embodiment. FIG. 10 is a flowchart of the example of the information processing executed by the information processing apparatus 11B of the present embodiment. The order of a plurality of steps can be changed as appropriate and is not limited to the example in FIG. 10. At least partial steps of the steps may be executed in parallel.

The first acquisition module 20A acquires the input image 50 from the photographing unit 12 (Step S200). The editing module 20B clarifies the first image 52 received from the first acquisition module 20A (Step S202). With the processing at Step S202, the display image 53 is generated. The second output control module 20C outputs the display image 53 generated at Step S202 to the display unit 14 (Step S204). The expansion module 20E expands the histogram of brightness of the second image 54 received from the first acquisition module 20A (Step S206). With the processing at Step S206, the expanded image 55 is generated. Step S200 to Step S206 are similar to Step S100 to Step S106 of the first embodiment.

The second acquisition module 22K acquires the first distance image from the first sensor 18 (Step S208). The first distance image acquired at Step S208 is obtained by observing the same environment at the same time as the input image 50 acquired at Step S200.

The information processing apparatus 11B repeats the processing at Step S210 to Step S228 for each of the pixels of the input image 50 (the first image 52 and the second image 54) acquired at Step S200.

Specifically, the first extraction module 20D extracts the first characteristic point information for the pixel to be processed in the display image 53 generated at Step S202 (Step S210).

The third extraction module 22L extracts the third characteristic point information of a detection point at a position corresponding to the pixel to be processed at Step S210 among the detection points included in the first distance image acquired at Step S208 (Step S212).

The OR operation module 22O performs an OR operation of the first characteristic point information extracted at Step S210 and the third characteristic point information extracted at Step S212 (Step S214). The OR operation module 22O obtains a binarized result of the first characteristic point information extracted at Step S210 by the binarization module 22N, for example. The OR operation module 22O obtains a binarized result of the third characteristic point information extracted at Step S212 by the binarization module 22M. The OR operation module 22O performs an OR operation of these binarized results.

The first generation module 20F reduces the data amount for the pixel at the pixel position to be processed at Step S210 in the expanded image 55 generated at Step S206 (Step S216). The second extraction module 20G extracts the second characteristic point information from the pixel the data amount of which has been reduced at Step S216 (Step S218).

The OR operation module 22O derives the fourth characteristic point information (Step S220). The OR operation module 22O uses the first characteristic point information as the fourth characteristic point information for the pixel the result of the OR operation of which is "1" (true) based on the result of the OR operation at Step S214 and the binarized result of the first characteristic point information of which is "1." On the other hand, the OR operation module 22O uses the first correction information in place of the first characteristic point information as the fourth characteristic point information for the pixel the result of the OR operation of which is "1" (true) and the binarized result of the first characteristic point information of which is "0." The OR operation module 22O uses the first characteristic point information as the fourth characteristic point information for the pixel the result of the OR operation of which is "0" (false).

The derivation module 22H derives the difference between the fourth characteristic point information derived at Step S220 and the second characteristic point information extracted at Step S218 (Step S222). The derivation module 22H determines whether the difference derived at Step S222 is the first threshold or more (Step S224).

When the difference derived at Step S222 is the first threshold or more (Yes at Step S224), the derivation module 22H outputs a correction instruction for the pixel value of the pixel used for the derivation of the difference to the first correction module 20I. The first correction module 20I having received the correction instruction corrects the pixel value of the pixel for which the difference has been determined to be the first threshold or more at Step S224 included in the expanded image 55 generated at Step S206 in accordance with the difference (Step S226). The first correction module 20I outputs the pixel value of the corrected pixel to the first generation module 20F, and the process returns to Step S216. At Step S216, the first generation module 20F reduces the data amount of the corrected pixel, and the above processing is repeated.

On the other hand, when the difference derived at Step S222 is less than the first threshold (No at Step S224), the derivation module 22H outputs an output target instruction setting the pixel at the pixel position used for the derivation of the difference among the pixels included in the third image 56 as an output target to the first output control module 20J. The first output control module 20J holds the pixel value of the pixel at the pixel position indicated in the received output target instruction in the third image 56 as an output target (Step S228).

Upon end of the processing at Step S210 to Step S228 for all the pixels of the input image 50 (the first image 52 and the second image 54) acquired at Step S200, the process advances to Step S230. The first output control module 20J outputs the output image 58 being the third image 56 including pixels the difference of which is less than the first threshold to the learning unit 16 (Step S230). Then, the present routine ends.

As described in the foregoing, in the information processing apparatus 11B of the present embodiment, the second acquisition module 22K acquires the first distance image specifying the distance information from the first sensor 18 of each of the detection points included in the photographing environment of the input image 50. The third extraction module 22L extracts the third characteristic point information from the first distance image. The derivation module 22H derives the difference between the fourth characteristic point information generated based on the OR operation of the first characteristic point information and the third characteristic point information and the second characteristic point information.

From the first image 52 being the input image 50 obtained by the photographing unit 12, the first characteristic point information indicating the change ratio of brightness can be detected regardless of the distance from the photographing unit 12 or the complexity of the contour of the object. However, in the first image 52, a smaller difference in brightness gives the first characteristic point information indicating a smaller change ratio. Thus, in the first image 52, an object the difference in brightness with respect to the background of which is smaller is more difficult to identify.

As described above, the first distance image is an image specifying the distance information from the first sensor 18 for each detection point. Thus, from the first distance image, the third characteristic point information indicating the change ratio of the distance information can be extracted regardless of the magnitude of the difference in brightness. However, in the first distance image, a more complicated contour of an object included in the photographing environment or an area more difficult for light output from the first sensor 18 to reach gives the third characteristic point information indicating a smaller change ratio. Thus, in the first distance image, an object the contour of which is more complicated or an object in an area more difficult for light to reach is more difficult to identify.

In the present embodiment, the information processing apparatus 11B performs the OR operation of the third characteristic point information extracted from the first distance image and the first characteristic point information extracted from the first image 52. With this OR operation, the information processing apparatus 11B can obtain the information in which the characteristic point of the object identified from the first distance image is added to the first image 52 as the fourth characteristic point information.

The derivation module 22H derives the difference between the fourth characteristic point information and the second characteristic point information. Thus, the information processing apparatus 11B of the present embodiment further uses the third characteristic point information extracted from the first distance image and can thereby derive the difference between the fourth characteristic point information and the second characteristic point information using the first image 52 with object identification accuracy improved.

Consequently, the information processing apparatus 11B of the present embodiment can provide an image with the characteristic point loss further inhibited and with a reduced data amount in addition to the effect of the first embodiment.

Third Embodiment

In the first embodiment, the input image 50 is acquired to be used for the information processing. The present embodiment describes an aspect in which the input image 50 and direction information are acquired to be used for information processing.

In the present embodiment and the following embodiments, parts having the same function and configuration as those of the first and second embodiments are given the same symbols, and detailed descriptions thereof are omitted.

Figure 11:
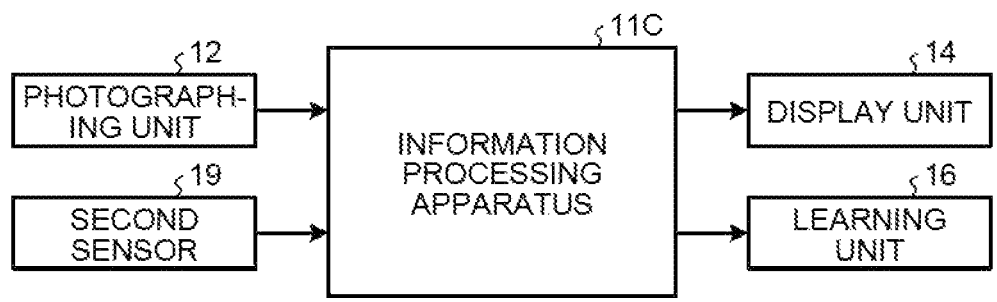
FIG. 11 is a diagram of an example of an entire configuration of an information processing system of a third embodiment.

FIG. 11 is a diagram of an example of an entire configuration of an information processing system 1C of the present embodiment. The information processing system 1C includes an information processing apparatus 11C, the photographing unit 12, the display unit 14, the learning unit 16, and a second sensor 19. The photographing unit 12, the display unit 14, the learning unit 16, and the second sensor 19 and the information processing apparatus 11C are connected to each other in a data-or-signal-transferrable manner. The photographing unit 12, the display unit 14, and the learning unit 16 are similar to those of the first embodiment.

The second sensor 19 obtains the direction information indicating a direction of an object included in the photographing environment of the input image 50 from the second sensor 19. Specifically, the second sensor 19 outputs the direction information indicating the presence or absence of the object, the distance to the object, and the direction of the object to the information processing apparatus 11C, for example.

The second sensor 19 is a sonar detecting an object with sound waves or ultrasonic waves or a microphone collecting voices and outputting voice data, for example. The second sensor 19 analyzes the strength of the received sound waves, ultrasonic waves, or voice data by a known method to derive the direction information indicating the direction of the object. In this process, the second sensor 19 may further derive the presence or absence of the object and the distance from the second sensor 19 to the object through the analysis of the received sound waves, ultrasonic waves, or voice data. The present embodiment describes a case in which the direction information is information indicating the presence or absence of the object, the distance from the second sensor 19 to the object, and the direction of the object as an example. The second sensor 19 outputs the direction information to the information processing apparatus 11C. The analysis of the received sound waves, ultrasonic waves, or voice data may be executed by the information processing apparatus 11C.

The information processing apparatus 11C receives the input image 50 from the photographing unit 12. The information processing apparatus 11C receives the direction information from the second sensor 19. It is assumed that the information processing apparatus 11C receives the input image 50 and the direction information obtained at the same time. That is to say, the information processing apparatus 11C receives the input image 50 and the direction information of the same environment. The information processing apparatus 11C executes the information processing using the received input image 50 and direction information. The hardware configuration of the information processing apparatus 11C is similar to that of the information processing apparatus 10.

Figure 12:
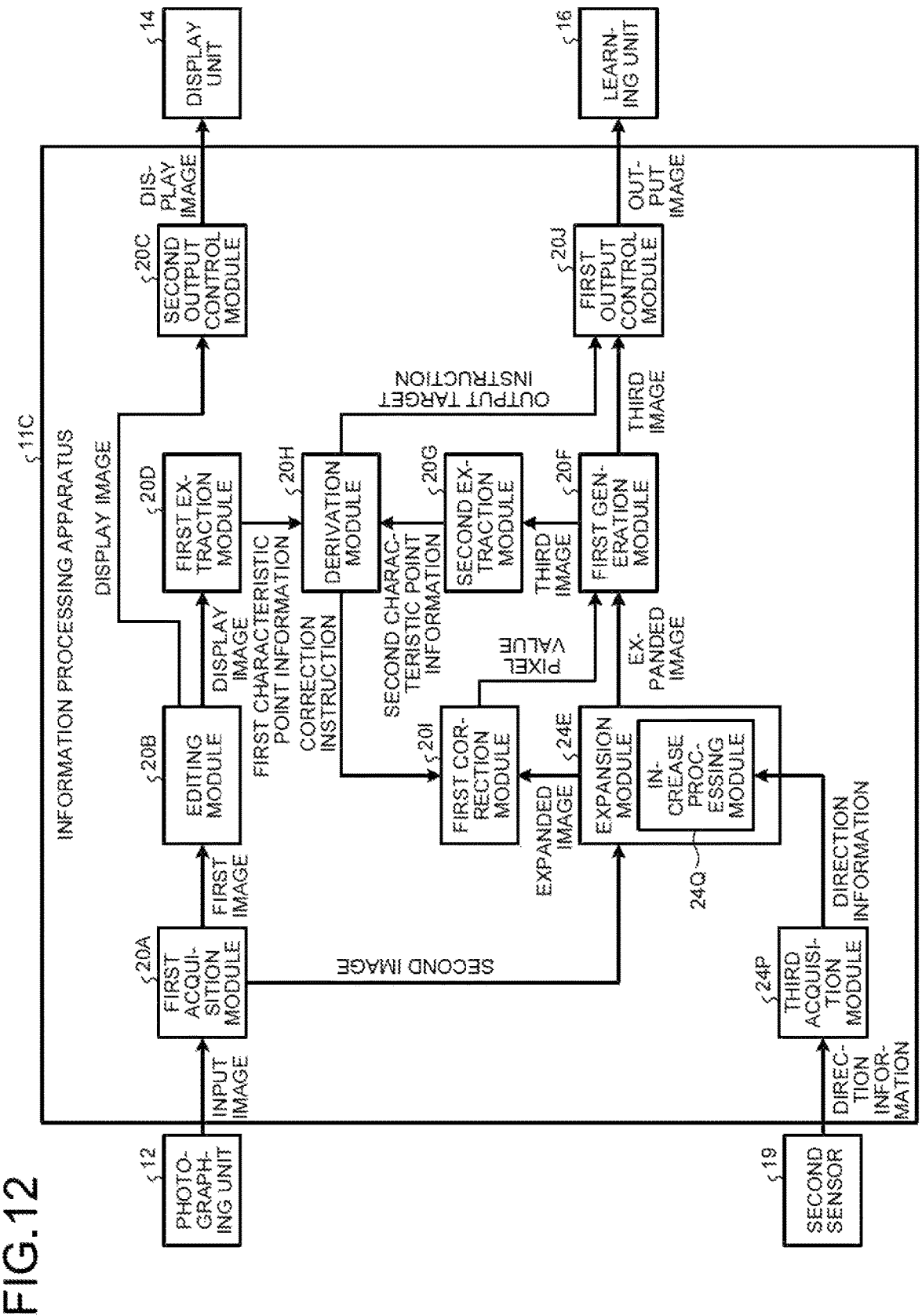
FIG. 12 is a diagram of an example of functions of an information processing apparatus of the third embodiment.

FIG. 12 is a diagram of an example of functions of the information processing apparatus 11C.

The information processing apparatus 11C includes the first acquisition module 20A, the editing module 20B, the second output control module 20C, the first extraction module 20D, and an expansion module 24E. The information processing apparatus 11C includes the first generation module 20F, the second extraction module 20G, the derivation module 20H, the first correction module 20I, the first output control module 20J, and a third acquisition module 24P.

Part or the whole of the units may be implemented by causing a processor such as the CPU 10A to execute a computer program, that is, by software, for example. Part or the whole of the units may be implemented by hardware such as an integrated circuit (IC) or be implemented by using both software and hardware.

The information processing apparatus 11C of the present embodiment includes the expansion module 24E in place of the expansion module 20E of the first embodiment. The information processing apparatus 11C further includes the third acquisition module 24P.

The third acquisition module 24P acquires the direction information from the second sensor 19. As described above, the direction information is information indicating the presence or absence of the object, the distance to the object, and the direction of the object. The third acquisition module 24P outputs the acquired direction information to the expansion module 24E.

The third acquisition module 24P may output the direction information to the expansion module 24E when the distance between the object included in the photographing environment and the second sensor 19 indicated by the acquired direction information is less than a preset fourth threshold. For the fourth threshold, a value for determining whether the object is an object the contour or the boundary of which is to be emphasized may be set in advance.

The expansion module 24E expands the histogram of brightness of the second image 54 received from the first acquisition module 20A like the expansion module 20E of the first embodiment. In the present embodiment, the expansion module 24E has an increase processing module 24Q.

The increase processing module 24Q increases a data amount of an object area corresponding to the direction information in the entire area of the second image 54.

Specifically, the increase processing module 24Q determines an area in which the object indicated by the direction information is present in the entire area of the second image 54 to be the object area, for example. Specifically, the increase processing module 24Q determines an area in which an object the distance from the second sensor 19 indicated by the direction information of which is less than the fourth threshold is present to be the object area. The increase processing module 24Q may analyze the sound waves, the ultrasonic waves, or the voice data received by the second sensor 19 by a known method to estimate a direction in which the object is positioned and a range of the object in the photographing environment. The increase processing module 24Q may determine the estimated direction and range in the second image 54 to be the object area.

The increase processing module 24Q increases the data amount of the determined object area in the entire area of the second image 54 expanded by the expansion module 24E.

Increasing the data amount of the object area indicates increasing the data amount of the object area from a current data amount. Specifically, increasing the data amount of the object area indicates increasing the bit depth from a current bit depth or increasing the resolution from a current resolution. For the increasing of the data amount of the object area, gamma correction or the like may be used, for example.

The object area in which the data amount is increased may be a pixel within the determined object area, a pixel forming a contour of the determined object area, or a pixel of an area including the determined object area among the pixels included in the second image 54. The present embodiment describes an aspect in which the increase processing module 24Q increases the data amount of the pixel forming the contour of the determined object area among the pixels included in the second image 54 as an example.

The increase processing module 24Q increases the data amount of the object area determined by the direction information in the entire area of the second image 54 and can thereby correct the second image 54 such that the characteristic point loss of the object is inhibited when the data amount of the second image 54 is reduced.

The expansion module 24E including the increase processing module 24Q generates the second image 54 expanded and including the object area with an increased data amount, as the expanded image 55 like the expansion module 20E of the first embodiment. The increase processing module 24Q then outputs the expanded image 55 to the first generation module 20F.

The first generation module 20F reduces the data amount of the expanded image 55 to generate the third image 56.

The object area of the expanded image 55 the data amount of which is to be reduced by the first generation module 20F has been increased in the data amount by the increase processing module 24Q. Thus, the object area of the third image 56 generated by reducing the data amount by the first generation module 20F is larger in the data amount than an area other than the object area. Thus, the second extraction module 20G extracts the second characteristic point information from the third image 56 and can thereby extract the second characteristic point information with the object area emphasized.

Figure 13:
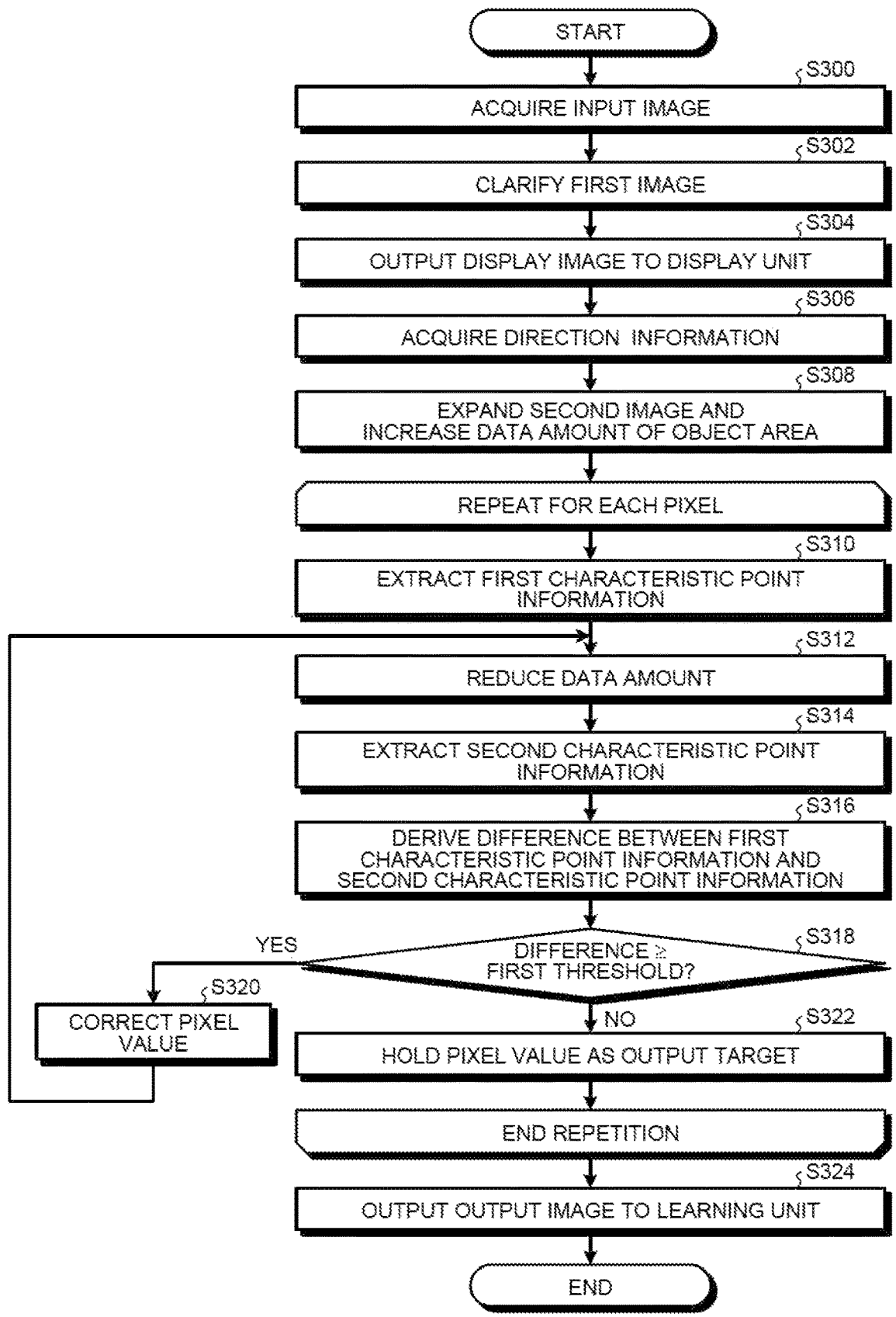
FIG. 13 is a flowchart of an example of information processing executed by the information processing apparatus of the third embodiment.

The following describes an example of a procedure of information processing executed by the information processing apparatus 11C of the present embodiment. FIG. 13 is a flowchart of the example of the information processing executed by the information processing apparatus 11C of the present embodiment. The order of a plurality of steps can be changed as appropriate and is not limited to the example in FIG. 13.

The first acquisition module 20A acquires the input image 50 from the photographing unit 12 (Step S300). The editing module 20B clarifies the first image 52 received from the first acquisition module 20A (Step S302). With the processing at Step S302, the display image 53 is generated. The second output control module 20C outputs the display image 53 generated at Step S302 to the display unit 14 (Step S304).

The third acquisition module 24P acquires the direction information from the second sensor 19 (Step S306). The expansion module 24E expands the histogram of brightness of the second image 54 received from the first acquisition module 20A. The increase processing module 24Q of the expansion module 24E increases the data amount of the object area corresponding to the direction information acquired at Step S306 in the expanded second image 54 (Step S308). With the processing at Step S308, the expanded image 55 is generated.

The first extraction module 20D, the first generation module 20F, the second extraction module 20G, the derivation module 20H, and the first correction module 20I repeat the processing at Step S310 to Step S322 for each pixel of the input image 50 (the first image 52 and the second image 54) acquired at Step S300. Step S310 to Step S322 are similar to Step S108 to Step S120 of the first embodiment (refer to FIG. 7).

Upon end of the processing at Step S310 to Step S322 for all the pixels of the input image 50 acquired at Step S300, the process advances to Step S324. The first output control module 20J outputs the output image 58 being the third image 56 including pixels the difference of which is less than the first threshold to the learning unit 16 (Step S324). Then, the present routine ends.

As described in the foregoing, in the information processing apparatus 11C of the present embodiment, the third acquisition module 24P acquires the direction information indicating the direction of the object included in the photographing environment of the input image 50 from the second sensor 19. The increase processing module 24Q increases the data amount of the object area corresponding to the direction information in the entire area of the second image 54. The first generation module 20F generates the third image 56 obtained by reducing the data amount of the second image 54, the second image 54 including the object area with an increased data amount.

The object area of the second image 54 the data amount of which is to be reduced by the first generation module 20F has been increased in the data amount by the increase processing module 24Q. Thus, the object area of the third image 56 generated by reducing the data amount by the first generation module 20F is larger in the data amount than an area other than the object area. Thus, the second extraction module 20G extracts the second characteristic point information from the third image 56 and can thereby extract the second characteristic point information with the object area emphasized. That is to say, the derivation module 20H can derive the difference with higher accuracy than the first embodiment.

Thus, the first correction module 20I corrects the expanded image 55 in accordance with the difference, whereby the third image 56 with the characteristic point loss further inhibited than the first embodiment can be output as the output image 58.

Consequently, the information processing apparatus 11C of the present embodiment can provide an image with the characteristic point loss further inhibited and with a reduced data amount in addition to the effect of the first embodiment.

Fourth Embodiment

In the first embodiment, the input image 50 is acquired to be used for the information processing. The present embodiment describes an aspect in which the input image 50, distance information, and the direction information are acquired to be used for information processing.

In the present embodiment and the following embodiment, parts having the same function and configuration as those of the first to third embodiments are given the same symbols, and detailed descriptions thereof are omitted.

Figure 14:
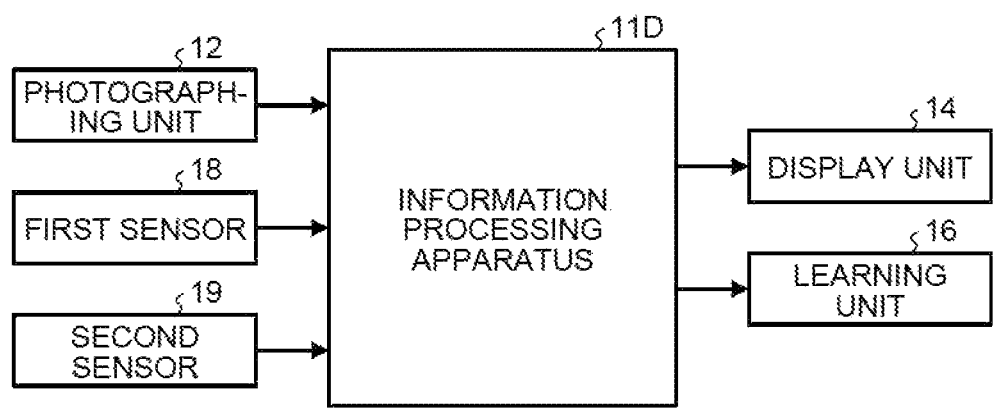
FIG. 14 is a diagram of an example of an entire configuration of an information processing system of a fourth embodiment.

FIG. 14 is a diagram of an example of an entire configuration of an information processing system 1D of the present embodiment. The information processing system 1D includes an information processing apparatus 11D, the photographing unit 12, the display unit 14, the learning unit 16, the first sensor 18, and the second sensor 19. The photographing unit 12, the display unit 14, the learning unit 16, the first sensor 18, and the second sensor 19 and the information processing apparatus 11D are connected to each other in a data-or-signal-transferrable manner. The photographing unit 12, the display unit 14, the learning unit 16, the first sensor 18, and the second sensor 19 are similar to those of the first to third embodiments.

The information processing apparatus 11D receives the input image 50 from the photographing unit 12. The information processing apparatus 11D receives the first distance image from the first sensor 18. The information processing apparatus 11D receives the direction information from the second sensor 19. It is assumed that the information processing apparatus 11D receives the input image 50, the first distance image, and the direction information obtained at the same time. That is to say, the information processing apparatus 11D receives the input image 50, the first distance image, and the direction information of the same photographing environment. The information processing apparatus 11D executes the information processing using the received input image 50, first distance image, and direction information. The hardware configuration of the information processing apparatus 11D is similar to that of the information processing apparatus 10.

Figure 15:
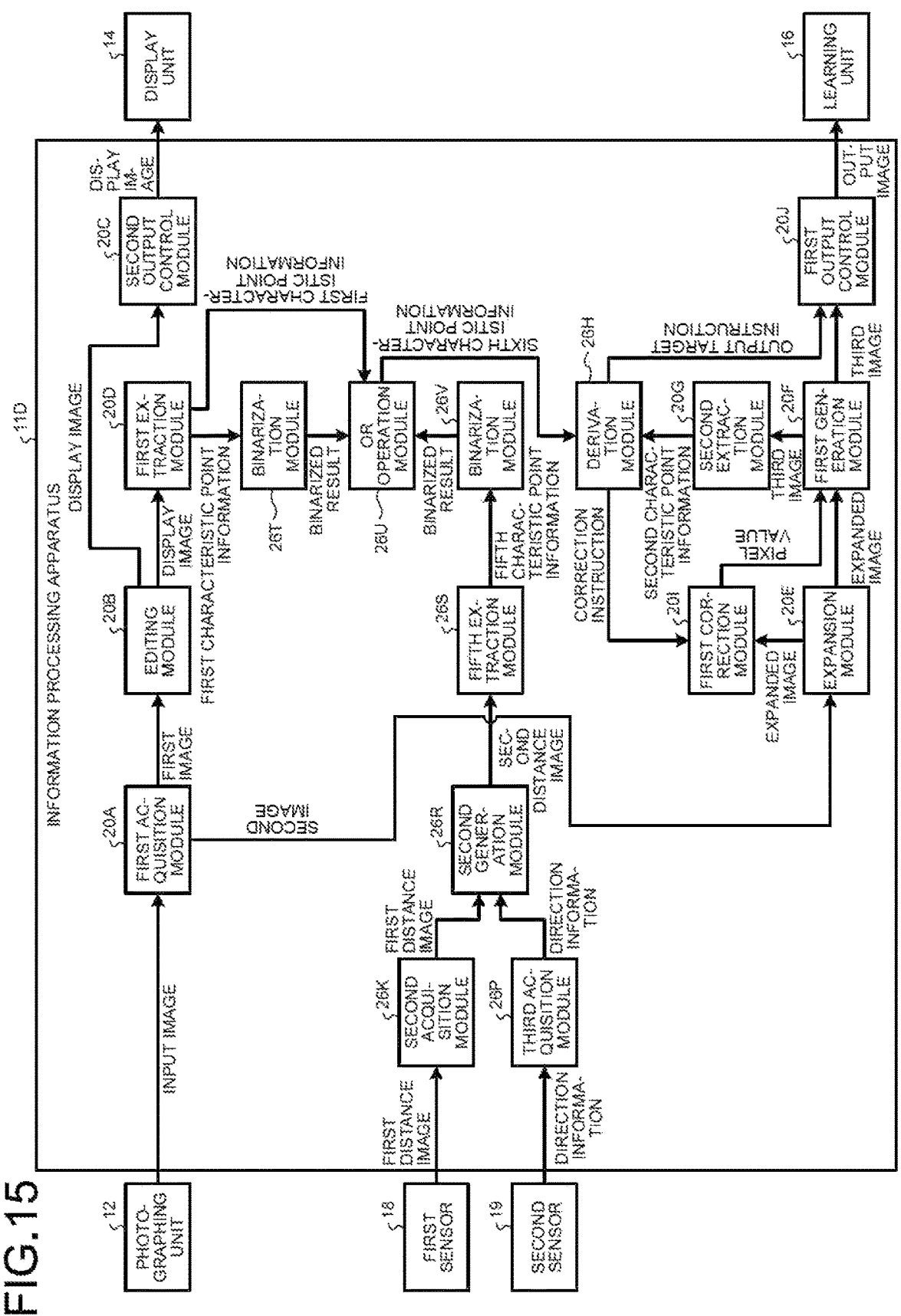
FIG. 15 is a diagram of an example of functions of an information processing apparatus of the fourth embodiment.

FIG. 15 is a diagram of an example of functions of the information processing apparatus 11D.

The information processing apparatus 11D includes the first acquisition module 20A, the editing module 20B, the second output control module 20C, the first extraction module 20D, the expansion module 20E, the first generation module 20F, the second extraction module 20G, a derivation module 26H, and the first correction module 20I. The information processing apparatus 11D includes the first output control module 20J, a second acquisition module 26K, a third acquisition module 26P, a second generation module 26R, a fifth extraction module 26S, and a binarization module 26V. The information processing apparatus 11D includes a binarization module 26T and an OR operation module 26U.

Part or the whole of the units may be implemented by causing a processor such as the CPU 10A to execute a computer program, that is, by software, for example. Part or the whole of the units may be implemented by hardware such as an integrated circuit (IC) or be implemented by using both software and hardware.

The information processing apparatus 11D of the present embodiment includes the derivation module 26H in place of the derivation module 20H of the first embodiment. The information processing apparatus 11D further includes the second acquisition module 26K, the third acquisition module 26P, the second generation module 26R, the fifth extraction module 26S, the binarization module 26V, the OR operation module 26U, and the binarization module 26T in addition to the functions of the information processing apparatus 10 of the first embodiment.

The second acquisition module 26K acquires the first distance image from the first sensor 18. The third acquisition module 26P acquires the direction information from the second sensor 19. The first distance image and the direction information are similar to those of the first and second embodiments.

The second generation module 26R corrects the first distance image acquired by the second acquisition module 26K using the direction information acquired by the third acquisition module 26P. With this correction, the second generation module 26R generates a second distance image from the first distance image.

Specifically, the second generation module 26R corrects the distance information of a detection point within the object area corresponding to the direction information in the entire area of the first distance image such that a change ratio of the distance information with respect to another surrounding detection point increases, for example. With this correction, the second generation module 26R generates the second distance image.

Specifically, the second generation module 26R determines an area in which the object indicated by the direction information is present in the entire area of the first distance image to be the object area. The method for determining the object area is similar to that of the third embodiment.

The second generation module 26R corrects the distance information of the detection point of the object area among the detection points included in the first distance image such that the change ratio with respect to the other surrounding detection point becomes larger than the current change ratio. Thus, the distance information of the detection point forming the contour of the object area among the detection points included in the first distance image is corrected so as to be a value further emphasizing the contour.

The object area to be corrected in the entire area of the first distance image may be a detection point within the determined object area, a detection point forming the contour of the determined object area, or a detection point of an area including the determined object area among the detection points included in the first distance image. The present embodiment describes an aspect in which the second generation module 26R corrects the distance information of the detection point forming the contour of the determined object area among the detection points included in the first distance image to generate the second distance image.

The fifth extraction module 26S extracts fifth characteristic point information from the second distance image. The fifth characteristic point information is information indicating at least a partial characteristic point of the object included in the second distance image. The characteristic point is similar to that of the second embodiment. The present embodiment describes a case in which the fifth characteristic point information is information indicating the contour line of the object included in the second distance image as an example.

In the present embodiment, the fifth extraction module 26S extracts the fifth characteristic point information from the second distance image using a high-pass filter. The high-pass filer is similar to that of the second embodiment. That is to say, the fifth extraction module 26S derives a change ratio of the distance information with respect to a surrounding detection point for each of a plurality of detection points forming the second distance image using the high-pass filter to extract the fifth characteristic point information. The definition of the surrounding detection point is similar to that of the second embodiment.

The second distance image is a distance image obtained by increasing the change ratio of the distance information with respect to the surrounding detection point for the distance information of the detection point of the object area included in the first distance image. That is to say, the second distance image is an image obtained by correcting the distance information for the detection point forming the contour of the object area included in the first distance image so as to be a value further emphasizing the contour. Thus, the fifth extraction module 26S can extract the fifth characteristic point information with the object further emphasized than the case in which the first distance image is used.

Like the second embodiment, the change ratio of the distance information indicates a change ratio of a distance represented by the distance information. Thus, in the present embodiment, the fifth extraction module 26S extracts the change ratio of the distance information with respect to the surrounding detection point, that is, the gradient of distance (a differential value) as the fifth characteristic point information for each of a plurality of detection points included in the second distance image.

The fifth extraction module 26S may extract the fifth characteristic point information included in the second distance image by a known method, and the method is not limited to the aspect using the high-pass filter.

The binarization module 26V binarizes the fifth characteristic point information extracted by the fifth extraction module 26S. The binarization module 26V derives a binarized result "1" (true) when the fifth characteristic point information is a preset fifth threshold or more and derives a binarized result "0" (false) when the fifth characteristic point information is less than the fifth threshold.

For the fifth threshold, a threshold for determining whether the information is information indicating the contour line of the object may be set in advance.

The binarization module 26V outputs the binarized result to the OR operation module 26U. Specifically, the binarization module 26V outputs the binarized result of the fifth characteristic point information and identification information of the detection point indicating the fifth characteristic point information to the OR operation module 26U, for example. The identification information of the detection point is information indicating a position in the second distance image, for example.

The first extraction module 20D derives the change ratio of the pixel value with respect to the surrounding pixel for each of the pixels forming the first image 52 to extract the first characteristic point information like the first embodiment. The first extraction module 20D outputs the extracted first characteristic point information and the identification information of the pixel from which the first characteristic point information has been extracted to the derivation module 26H successively for each pixel.

In the present embodiment, the first extraction module 20D further outputs the extracted first characteristic point information and the identification information of the pixel from which the first characteristic point information has been extracted to the binarization module 26T for each pixel.

The binarization module 26T binarizes the first characteristic point information extracted by the first extraction module 20D. The binarization module 26T derives a binarized result "1" (true) when the first characteristic point information is the preset third threshold or more and derives a binarized result "0" (false) when the first characteristic point information is less than the third threshold like the binarization module 22N of the second embodiment (refer to FIG. 9). The third threshold is similar to that of the second embodiment.

The binarization module 26T outputs the binarized result to the OR operation module 26U. Specifically, the binarization module 26T outputs the binarized result of the first characteristic point information and the identification information of the pixel indicating the first characteristic point information to the OR operation module 26U, for example. The identification information of the pixel is information indicating the position in the first image 52 as described above.

The OR operation module 26U performs an OR operation of the first characteristic point information and the fifth characteristic point information. Specifically, the OR operation module 26U performs an OR operation of the binarized result of the first characteristic point information by the binarization module 26T and the binarized result of the fifth characteristic point information by the binarization module 26V, for example. In this process, the OR operation module 26U, for each of the pixels forming the first image 52, performs an OR operation of the binarized result of the first characteristic point information and the binarized result of the fifth characteristic point information of the detection point at a position corresponding to each pixel. Although FIG. 15 illustrates the OR operation module 26U and the binarization modules 26T and 26V as independent functional units, the OR operation module 26U can also include the functions of the binarization module 26T and the binarization module 26V therewithin.

That is to say, the OR operation module 26U derives "1" when at least one of the binarized result of the first characteristic point information by the binarization modules 26T and the binarized result of the fifth characteristic point information by the binarization module 26V is "1." The OR operation module 26U derives "0" when both the binarized result of the first characteristic point information by the binarization module 26T and the binarized result of the fifth characteristic point information by the binarization module 26V are "0."

The OR operation module 26U uses the first characteristic point information as sixth characteristic point information for a pixel the result of the OR operation of which is "1" (true) based on the result of the OR operation and the binarized result of the first characteristic point information of which is "1." On the other hand, the OR operation module 22O uses second correction information in place of the sixth characteristic point information as the fourth characteristic point information for a pixel the result of the OR operation of which is "1" (true) based on the result of the OR operation and the binarized result of the sixth characteristic point information of which is "0." The second correction information may be a value of the third threshold or more and can be a preset fixed value of the third threshold or more, for example. The OR operation module 26U uses the first characteristic point information as the sixth characteristic point information for a pixel the result of the OR operation of which is "0" (false) based on the result of the OR operation.

Thus, the OR operation module 26U can obtain information in which the characteristic point of the object identified from the second distance image is added to the display image 53 based on the result of the OR operation. The second distance image is an image obtained by correcting the distance information for the detection point forming the contour of the object area included in the first distance image so as to be a value further emphasizing the contour. Thus, the OR operation module 26U can impart information according to the fifth characteristic point information with the object area of the first distance image emphasized to a pixel not including information indicating the characteristic point of the object included in the display image 53 based on the result of the OR operation.

Specifically, the OR operation module 26U corrects the first characteristic point information based on the result of performing the OR operation and can thereby generate the sixth characteristic point information. That is to say, the OR operation module 26U can set the sixth characteristic point information indicating a change amount larger than a change amount included in the first characteristic point information based on the fifth characteristic point information with the object area emphasized extracted from the second distance image corrected so as to be the value further emphasizing the contour of the object area for the pixel not including the information indicating the characteristic point of the object in the display image 53.

The OR operation module 26U outputs the sixth characteristic point information generated based on the result of the OR operation for each of the pixels forming the display image 53 and the identification information of the pixel to the derivation module 26H successively for each pixel.

The derivation module 26H derives the difference between the sixth characteristic point information received from the OR operation module 26U and the second characteristic point information for each pixel of the third image 56 corresponding to the first image 52.

The derivation module 26H determines whether the derived difference is the first threshold or more like the derivation module 20H of the first embodiment. When the derived difference is the first threshold or more, the derivation module 26H outputs a correction instruction for the pixel value of the pixel used for the derivation of the difference among the pixels included in the third image 56 to the first correction module 20I. On the other hand, when the derived difference is less than the first threshold, the derivation module 26H outputs an output target instruction setting the pixel at the pixel position used for the derivation of the difference among the pixels included in the third image 56 as an output target to the first output control module 20J.

Thus, in the present embodiment, the derivation module 26H derives the difference between the sixth characteristic point information generated by correcting the first characteristic point information based on the result of performing the OR operation of the first characteristic point information and the fifth characteristic point information and the second characteristic point information extracted from the second image 54. Like the first embodiment, the first correction module 20I corrects the second image 54 in accordance with the difference. The first output control module 20J outputs, as the output image 58 to the learning unit 16, the third image 56 obtained by reducing the data amount of the second image 54, the second image 54 being corrected in accordance with the difference.

The first correction module 20I may correct the third image 56 generated by the first generation module 20F in accordance with the difference like the first embodiment.

Figure 16:
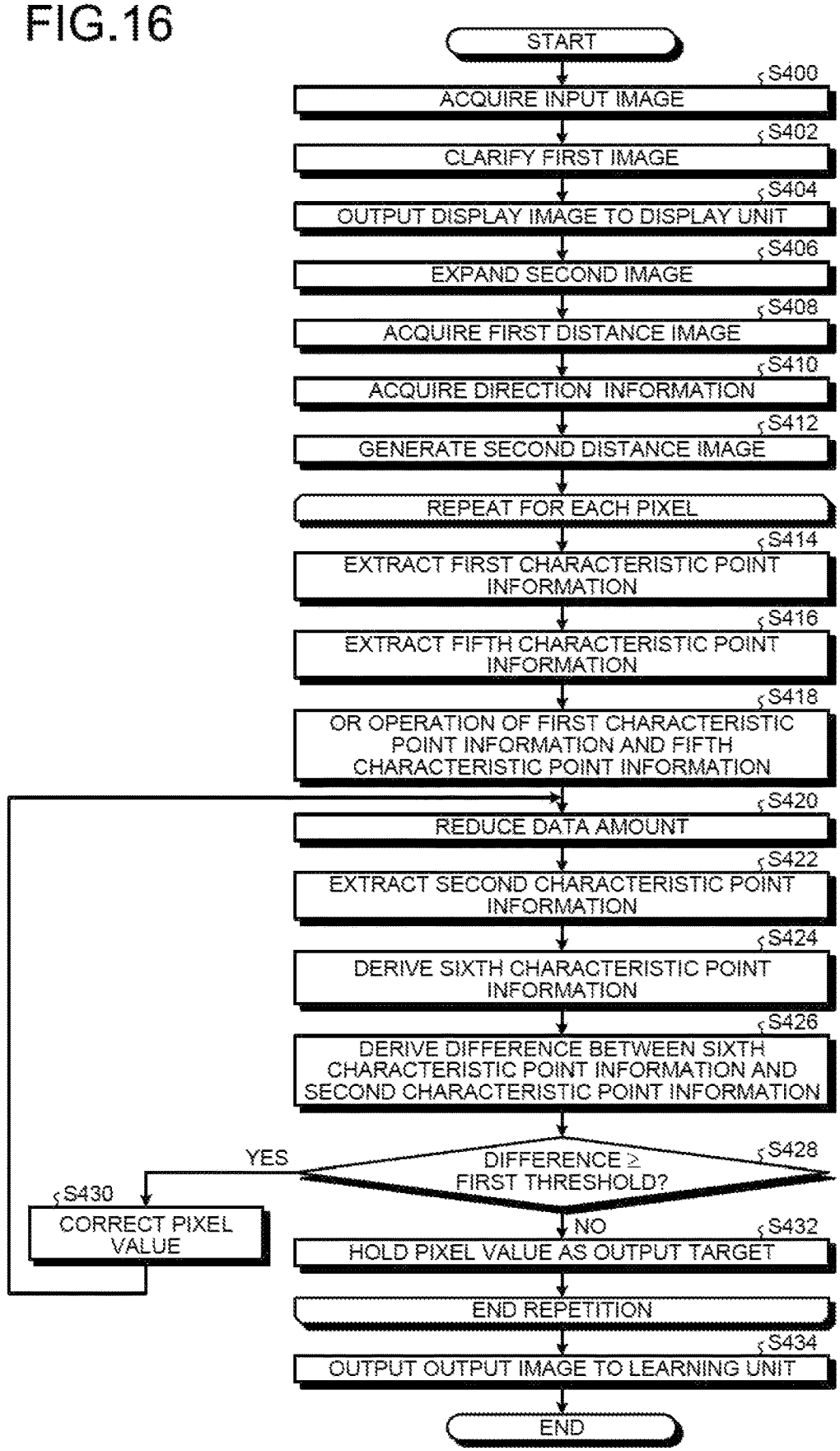
FIG. 16 is a flowchart of an example of information processing executed by the information processing apparatus of the fourth embodiment.

The following describes an example of a procedure of information processing executed by the information processing apparatus 11D of the present embodiment. FIG. 16 is a flowchart of the example of the information processing executed by the information processing apparatus 11D of the present embodiment. The order of a plurality of steps can be changed as appropriate and is not limited to the example in FIG. 16.

The first acquisition module 20A acquires the input image 50 from the photographing unit 12 (Step S400). The editing module 20B clarifies the first image 52 received from the first acquisition module 20A (Step S402). With the processing at Step S402, the display image 53 is generated. The second output control module 20C outputs the display image 53 generated at Step S402 to the display unit 14 (Step S404). The expansion module 20E expands the histogram of brightness of the second image 54 received from the first acquisition module 20A (Step S406). With the processing at Step S406, the expanded image 55 is generated. Step S400 to Step S406 are similar to Step S100 to Step S106 of the first embodiment.

The second acquisition module 26K acquires the first distance image from the first sensor 18 (Step S408). The third acquisition module 26P acquires the direction information from the second sensor 19 (Step S410). The first distance image acquired at Step S408 and the direction information acquired at Step S410 are obtained by observing the same environment at the same time as the input image 50 acquired at Step S400.

The second generation module 26R corrects the first distance image acquired at Step S408 using the direction information acquired at Step S410. With this correction, the second generation module 26R generates the second distance image from the first distance image (Step S412).

The information processing apparatus 11D repeats the processing at Step S414 to Step S432 for each pixel of the input image 50 (the first image 52 and the second image 54) acquired at Step S400.

Specifically, the first extraction module 20D extracts the first characteristic point information for the pixel to be processed in the first image 52 clarified at Step S402 (Step S414).

The fifth extraction module 26S extracts the fifth characteristic point information for the pixel to be processed at the same pixel position as Step S414 in the second distance image generated at Step S412 (Step S416).

The OR operation module 26U performs an OR operation of the first characteristic point information extracted at Step S414 and the fifth characteristic point information extracted at Step S416 (Step S418). The OR operation module 26U performs an OR operation of the binarized result of the first characteristic point information by the binarization module 26T and the binarized result of the fifth characteristic point information by the binarization module 26V, for example.

The first generation module 20F reduces the data amount for the pixel at the pixel position to be processed at Step S414 in the expanded image 55 generated at Step S406 (Step S420). The second extraction module 20G extracts the second characteristic point information from the pixel the data amount of which has been reduced at Step S420 (Step S422).

The OR operation module 26U derives the sixth characteristic point information (Step S424). The OR operation module 26U uses the first characteristic point information as the sixth characteristic point information for the pixel the result of the OR operation of which is "1" (true) based on the result of the OR operation at Step S418 and the binarized result of the first characteristic point information of which is "1". On the other hand, the OR operation module 26U uses the second correction information in place of the first characteristic point information as the sixth characteristic point information for the pixel the result of the OR operation of which is "1" (true) and the binarized result of the first characteristic point information of which is "0." The OR operation module 26U uses the first characteristic point information as the sixth characteristic point information for the pixel the result of the OR operation of which is "0" (false).

The derivation module 26H derives the difference between the sixth characteristic point information derived at Step S424 and the second characteristic point information extracted at Step S422 (Step S426). The derivation module 26H determines whether the difference derived at Step S426 is the first threshold or more (Step S428).

When the difference derived at Step S426 is the first threshold or more (Yes at Step S428), the derivation module 26H outputs a correction instruction for the pixel value of the pixel used for the derivation of the difference to the first correction module 20I. The first correction module 20I having received the correction instruction corrects the pixel value of the pixel the difference of which has been determined to be the first threshold or more at Step S428 included in the expanded image 55 generated at Step S406 in accordance with the difference (Step S430). The first correction module 20I then outputs the pixel value of the corrected pixel to the first generation module 20F, and the process returns to Step S420. At Step S420, the first generation module 20F reduces the data amount of the corrected pixel, and the above processing is repeated.

On the other hand, when the difference derived at Step S426 is less than the first threshold (No at Step S428), the derivation module 26H outputs an output target instruction setting the pixel at the pixel position used for the derivation of the difference among the pixels included in the third image 56 as an output target to the first output control module 20J. The first output control module 20J holds the pixel value of the pixel at the pixel position indicated in the output target instruction in the third image 56 as an output target (Step S432).

Upon end of the processing at Step S414 to Step S432 for all the pixels of the input image 50 (the first image 52 and the second image 54) acquired at Step S400, the process advances to Step S434. The first output control module 20J outputs the output image 58 being the third image 56 including pixels the difference of which is less than the first threshold to the learning unit 16 (Step S434). Then, the present routine ends.

As described in the foregoing, in the information processing apparatus 11D of the present embodiment, the second acquisition module 26K acquires the first distance image specifying the distance information from the first sensor 18 of each of the detection points included in the photographing environment of the input image 50. The third acquisition module 26P acquires the direction information indicating the direction of the object included in the photographing environment of the input image 50 from the second sensor 19. The second generation module 26R generates the second distance image obtained by increasing the change ratio of the distance information with respect to the other surrounding detection point for the distance information of the detection point within the object area according to the direction information in the entire area of the first distance image. The fifth extraction module 26S extracts the fifth characteristic point information from the second distance image. The derivation module 26H derives the difference between the sixth characteristic point information generated based on the result of performing the OR operation of the first characteristic point information and the fifth characteristic point information and the second characteristic point information.

From the first image 52 being the input image 50 obtained by the photographing unit 12, the first characteristic point information indicating the change ratio of brightness can be detected regardless of the distance from the photographing unit 12 or the complexity of the contour of the object. However, in the first image 52, a smaller difference in brightness gives the first characteristic point information indicating a smaller change ratio. Thus, in the first image 52, an object the difference in brightness with respect to the background of which is smaller is more difficult to identify.

Given these circumstances, in the present embodiment, the derivation module 26H performs an OR operation of the first characteristic point information extracted from the first image 52 and the fifth characteristic point information. The fifth characteristic point information is characteristic point information extracted from the second distance image with the object area of the first distance image emphasized. Thus, with this OR operation, the OR operation module 26U can impart the information according to the fifth characteristic point information with the object area of the first distance image emphasized to the pixel not including the information indicating the characteristic point of the object in the display image 53 based on the result of the OR operation.

The derivation module 26H derives the difference between the sixth characteristic point information generated based on the result of the OR operation and the second characteristic point information. Thus, the information processing apparatus 11D of the present embodiment, using the first image 52 obtained by emphasizing the characteristic point of the object identified from the first distance image and the direction information, can derive the difference between the sixth characteristic point information of the first image 52 after the emphasis and the second characteristic point information.

Consequently, the information processing apparatus 11D of the present embodiment can provide an image with the characteristic point loss further inhibited and with a reduced data amount in addition to the effects of the first to third embodiments.

Fifth Embodiment

The present embodiment describes an aspect in which the third image 56 is corrected using a fourth image generated based on a result of performing an OR operation of the first image 52 being the input image 50 and the second distance image generated from the distance information and the direction information.

In the present embodiment, parts having the same function and configuration as those of the first to fourth embodiments are given the same symbols, and detailed descriptions thereof are omitted.

Figure 17:
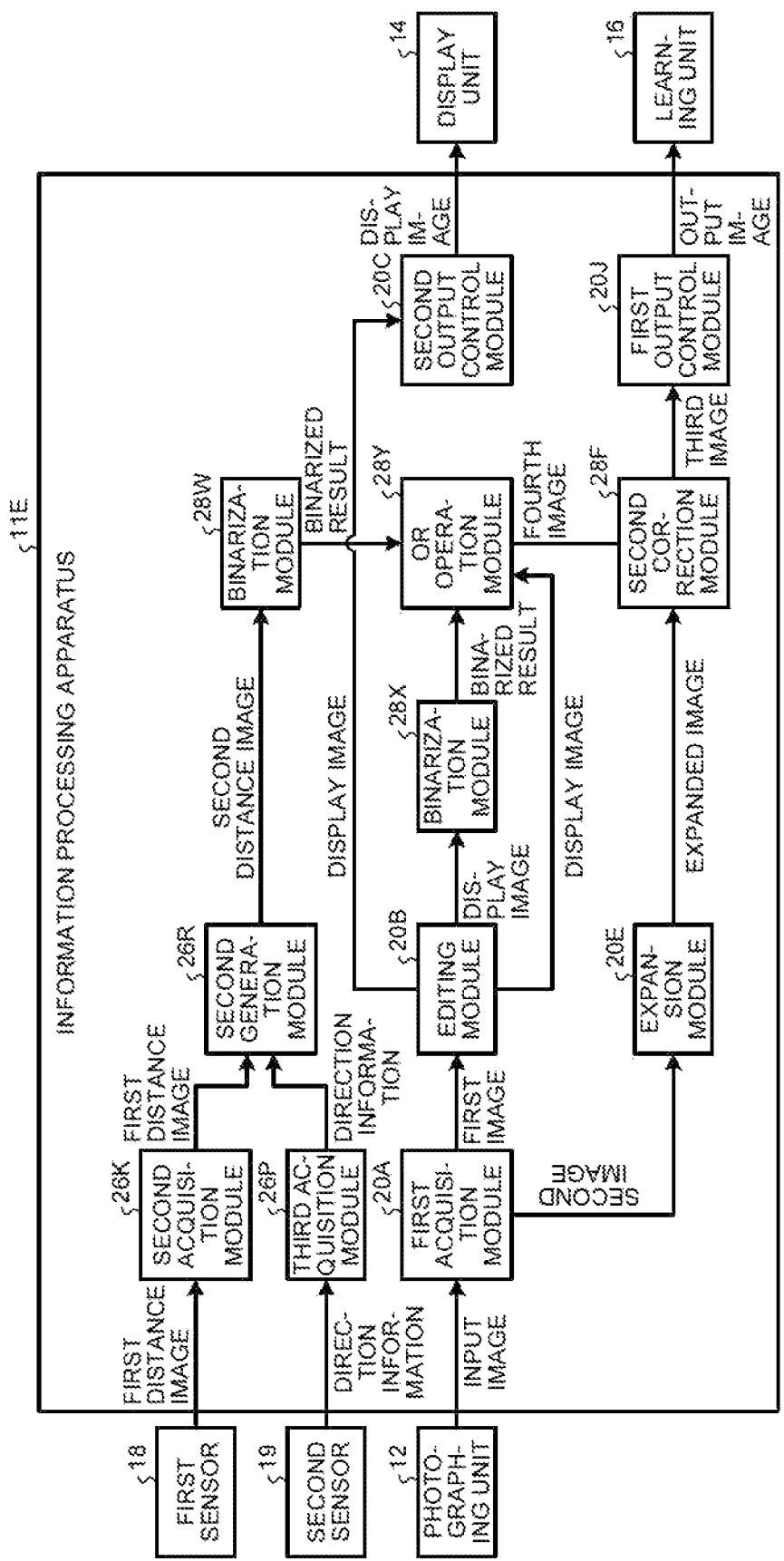
FIG. 17 is a diagram of an example of functions of an information processing apparatus of a fifth embodiment.

FIG. 17 is a diagram of an example of functions of an information processing apparatus 11E of the present embodiment. The configuration of an information processing system including the information processing apparatus 11E is similar to that of the information processing system 1D of the fourth embodiment except that the information processing apparatus 11E is included in place of the information processing apparatus 11D (refer to FIG. 14). The hardware configuration of the information processing apparatus 11E is similar to that of the information processing apparatus 10 of the first embodiment (refer to FIG. 2).

The information processing apparatus 11E includes the first acquisition module 20A, the editing module 20B, the second output control module 20C, the expansion module 20E, and the first output control module 20J. The information processing apparatus 11E includes the second acquisition module 26K, the third acquisition module 26P, the second generation module 26R, and a binarization module 28W. The information processing apparatus 11E includes a binarization module 28X, an OR operation module 28Y, and a second correction module 28F.

Part or the whole of the units may be implemented by causing a processor such as the CPU 10A to execute a computer program, that is, by software, for example. Part or the whole of the units may be implemented by hardware such as an integrated circuit (IC) or be implemented by using both software and hardware.

The first acquisition module 20A, the editing module 20B, the second output control module 20C, the expansion module 20E, and the first output control module 20J are similar to those of the first embodiment. The second acquisition module 26K, the third acquisition module 26P, and the second generation module 26R are similar to those of the fourth embodiment.

The binarization module 28W binarizes the second distance image for each detection point. The second distance image is a distance image generated by correcting the first distance image based on the direction information by the second generation module 26R like the fourth embodiment.

The binarization module 28W derives a binarized result "1" (true) when the distance information is a preset seventh threshold or more. The binarization module 28W derives a binarized result "0" (false) when the distance information is less than the seventh threshold. For the seventh threshold, a threshold for determining whether the information is information indicating the contour line of the object may be set in advance.

The binarization module 28W outputs the binarized result to the OR operation module 28Y. Specifically, the binarization module 28W outputs the binarized result of each of a plurality of pixels included in the second distance image and the identification information of the pixel indicating the binarized result to the OR operation module 28Y, for example. The identification information of the pixel is information indicating the position in the input image 50 (the first image 52 and the second image 54).

The binarization module 28X binarizes the display image 53 received from the editing module 20B for each pixel. Specifically, the binarization module 28X derives a binarized result "1" (true) when the brightness indicated by the pixel value of the pixel of the display image 53 is a preset eighth threshold or more, for example. On the other hand, the binarization module 28X derives a binarized result "0" (false) when the brightness indicated by the pixel value is less than the eighth threshold. For the eighth threshold, a threshold for determining whether the information is information indicating the contour line of the object may be set in advance.

Next, the OR operation module 28Y generates the fourth image based on a result of performing an OR operation of the display image 53 and the second distance image. Specifically, the OR operation module 28Y generates the fourth image based on a result of performing an OR operation of a binarized result of the display image 53 and a binarized result of the second distance image, for example. The OR operation module 28Y may generate the fourth image based on a result of performing an OR operation of a binarized result of the first image 52 and the binarized result of the second distance image. In the present embodiment, the OR operation module 28Y acquires the display image 53 from the editing module 20B and performs the OR operation of the binarized result of the display image 53 and the binarized result of the second distance image.

First, the OR operation module 28Y performs an OR operation of the binarized result of the display image 53 by the binarization module 28X and the binarized result of the second distance image by the binarization module 28W. Although FIG. 17 illustrates the OR operation module 28Y and the binarization modules 28X and 28W as independent functional units, the OR operation module 28Y can also include the functions of the binarization modules 28X and 28W therewithin. In this case, the OR operation module 28Y, for each of the pixels forming display image 53, performs an OR operation of the binarized result of the display image 53 and a binarized result of the distance information of the detection point at a position corresponding to each pixel.

The OR operation module 28Y specifies a pixel value the change ratio with respect to the pixel value specified for the surrounding pixel of which is a ninth threshold or more for a pixel the result of the OR operation of which is "1" (true) for each of the pixels forming the display image 53. Specifically, the OR operation module 28Y, using a pixel value of a pixel to be processed and a pixel value of the surrounding pixel of the pixel in the display image 53, specifies the pixel value of the pixel to be processed as the above pixel value, for example. For the ninth threshold, a threshold for determining whether the information is information indicating the contour line or the boundary of the object may be set in advance.

The OR operation module 28Y specifies the pixel value of the pixel to be processed in the display image 53 being the first image 52 after the clarification by the editing module 20B for a pixel the result of the OR operation of which is "0" (false).

The OR operation module 28Y specifies the pixel value according to the result of the OR operation for all the pixels forming the display image 53 to generate the fourth image. That is to say, the OR operation module 28Y generates the fourth image based on the result of performing the OR operation of the binarized result of the display image 53 and the binarized result of the second distance image.

Thus, the OR operation module 28Y can generate the fourth image in which the characteristic point of the object identified from the second distance image is emphasized in the display image 53 as a result of the OR operation. That is to say, the OR operation module 28Y can add information indicating the characteristic point extracted from the second distance image to the pixel not including the information indicating the characteristic point of the object in the display image 53. In the present embodiment, the second distance image is a distance image obtained by increasing the change ratio of the distance information with respect to the surrounding detection point for the distance information of the detection point of the object area included in the first distance image. Thus, the OR operation module 28Y can obtain information in which the characteristic point with the object area identified from the second distance image emphasized is added to the display image 53 based on the result of the OR operation.

The first image 52 being the input image 50 obtained by the photographing unit 12 is an image that can determine the change ratio of brightness regardless of the distance from the photographing unit 12 or the complexity of the contour of the object. On the other hand, the first distance image and the direction information are information that can determine the change ratio of the distance information regardless of the magnitude of the difference in brightness. In the present embodiment, the OR operation module 28Y generates the fourth image by the above processing based on the first image 52, the first distance image, and the direction information.

Thus, the fourth image is an image specifying the characteristic point of the object with high precision regardless of the distance from the photographing unit 12, the complexity of the contour of the object, and the magnitude of the difference in brightness.

The second correction module 28F generates the third image 56 obtained by reducing the data amount of the expanded image 55, similarly to the first generation module 20F described in the first embodiment. In the present embodiment, the second correction module 28F further corrects a pixel value of a specific pixel among the pixels forming the third image 56. The specific pixel is a pixel at a pixel position corresponding to a pixel the change ratio with respect to the pixel value of the surrounding pixel of which is the ninth threshold or more among the pixels forming the fourth image generated by the OR operation module 28Y in the third image 56.

The second correction module 28F corrects the pixel value for the pixel corresponding to the pixel position the change ratio with respect to the pixel value of the surrounding pixel of which is the ninth threshold or more in the fourth image in the third image 56 such that the change ratio with respect the surrounding pixel becomes larger than the current change ratio. Specifically, the second correction module 28F, for the specific pixel included in the fourth image, corrects the brightness of the specific pixel such that the change ratio of brightness with respect to the surrounding pixel becomes larger than the current change ratio. The second correction module 28F outputs the third image 56 generated by correcting the fourth image to the first output control module 20J as the output image 58.

Thus, the second correction module 28F can output the third image 56 obtained by emphasizing the characteristic point of the object such as the contour line of the object included in the photographing environment to the first output control module 20J as the output image 58.

The first output control module 20J outputs the output image 58 received form the second correction module 28F to the learning unit 16.

Figure 18:
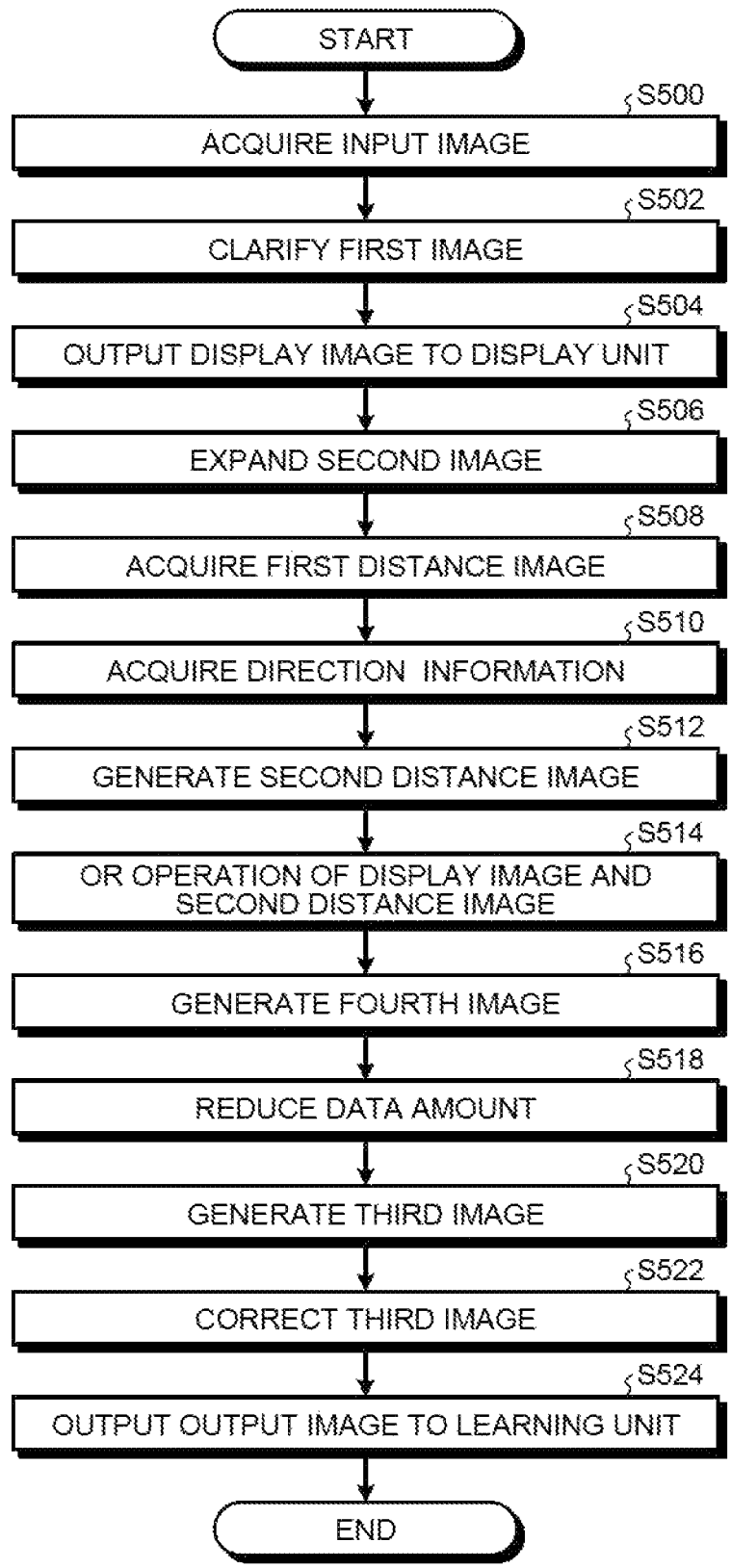
FIG. 18 is a flowchart of an example of information processing executed by the information processing apparatus of the fifth embodiment.

The following describes an example of a procedure of information processing executed by the information processing apparatus 11E of the present embodiment. FIG. 18 is a flowchart of the example of the information processing executed by the information processing apparatus 11E of the present embodiment. The order of a plurality of steps can be changed as appropriate and is not limited to the example in FIG. 18. At least partial steps of the steps may be executed in parallel as appropriate.

The first acquisition module 20A acquires the input image 50 from the photographing unit 12 (Step S500). The editing module 20B clarifies the first image 52 received from the first acquisition module 20A (Step S502). With the processing at Step S502, the display image 53 is generated. The second output control module 20C outputs the display image 53 generated at Step S502 to the display unit 14 (Step S504). The expansion module 20E expands the histogram of brightness of the second image 54 received from the first acquisition module 20A (Step S506). With the processing at Step S506, the expanded image 55 is generated. Step S500 to Step S506 are similar to Step S100 to Step S106 of the first embodiment.

The second acquisition module 26K acquires the first distance image from the first sensor 18 (Step S508). The third acquisition module 26P acquires the direction information from the second sensor 19 (Step S510). The first distance image acquired at Step S508 and the direction information acquired at Step S510 are obtained by observing the same environment at the same time as the input image 50 acquired at Step S500.

The second generation module 26R corrects the first distance image acquired at Step S508 using the direction information acquired at Step S510. With this correction, the second generation module 26R generates the second distance image from the first distance image (Step S512).

The OR operation module 28Y performs an OR operation of a binarized result obtained by binarizing the display image 53 generated at Step S502 by the binarization module 28X and a binarized result obtained by binarizing the second distance image generated at Step S512 by the binarization module 28W (Step S514).

The OR operation module 28Y specifies the pixel value according to the result of the OR operation at Step S514 for all the pixels forming the display image 53 to generate the fourth image (Step S516).

The second correction module 28F reduces the data amount of the expanded image 55 generated at Step S506 (Step S518). The second correction module 28F reduces the data amount to generate the third image 56 (Step S520).

The second correction module 28F further corrects the generated third image 56 using the fourth image generated at Step S516 (Step S522). The second correction module 28F determines the pixel corresponding to the pixel position the change ratio with respect to the pixel value of the surrounding pixel of which is the ninth threshold or more included in the fourth image in the third image 56. The second correction module 28F corrects the pixel value for the determined pixel such that the change ratio with respect to the surrounding pixel becomes larger than the current change ratio.

The first output control module 20J outputs the third image 56 corrected by the second correction module 28F to the learning unit 16 as the output image 58 (Step S524). Then the present routine ends.

As described in the foregoing, the information processing apparatus 11E of the present embodiment includes the first acquisition module 20A, the second acquisition module 26K, the third acquisition module 26P, the second generation module 26R, the OR operation module 28Y, and the second correction module 28F.

The first acquisition module 20A acquires the input image 50. The second acquisition module 26K acquires the first distance image specifying the distance information from the first sensor 18 of each of the detection points included in the photographing environment of the input image 50. The third acquisition module 26P acquires the direction information indicating the direction of the object included in the photographing environment of the input image 50 from the second sensor 19. The second generation module 26R generates the second distance image obtained by increasing the change ratio of the distance information with respect to the other surrounding detection point for the distance information of the detection point within the object area according to the direction information in the entire area of the first distance image. The OR operation module 28Y generates the fourth image based on the result of performing the OR operation of the first image 52 being the input image 50 and the second distance image. The second correction module 28F corrects the pixel value corresponding to the specific pixel among the pixels forming the third image 56 obtained by reducing the data amount of the second image 54, the second image 54 being the input image 50. The specific pixel is a pixel the change ratio of the pixel value with respect to the surrounding pixel of which is a threshold (the ninth threshold) or more among the pixels forming the fourth image.

The fourth image is an image generated based on the result of performing the OR operation of the binarized result of the display image 53 (or the first image 52) and the binarized result of the second distance image. That is to say, the fourth image is an image specifying the characteristic point of the object with high precision regardless of distance, the complexity of the contour, or the magnitude of the difference in brightness generated based on the direction information, the first distance image, and the first image 52. In the present embodiment, the second correction module 28F corrects the pixel value of the pixel corresponding to the pixel the change ratio of the pixel value with respect to the surrounding pixel is the threshold or more among the pixels forming the fourth image in the third image 56.

Thus, the output image 58 is an image obtained by correcting the third image 56 such that the contour line of the object at least part of which has disappeared by the data amount reduction processing is caused to appear or emphasized. In other words, the output image 58 is an image obtained by correcting the third image 56 being the second image 54 with a reduced data amount such that the object that has become lost by the data amount reduction processing is restored. Thus, the first output control module 20J can output the output image 58, which is an image with the characteristic point loss inhibited and with a reduced data amount.

Consequently, the information processing apparatus 11E of the present embodiment can provide an image with the characteristic point loss inhibited.

The embodiments have been described; the information processing apparatus and the information processing method disclosed by the present application are not limited to the embodiments described above as they are and, in an implementation stage, can be embodied with the components modified in a range not departing from the gist thereof. An appropriate combination of the components disclosed in the embodiments described above can form various inventions. Some components may be deleted from all the components indicated in the embodiments, for example.

The information processing apparatus 10 and the information processing apparatus 11B to the information processing apparatus 11E of the first to fifth embodiments can be used for various apparatuses including processing to reduce the data amount of images. The information processing apparatus 10 and the information processing apparatus 11B to the information processing apparatus 11E of the first to fifth embodiments can be used for a monitoring camera system processing images obtained from a monitoring camera, or an on-vehicle system processing images of a surrounding environment outside a vehicle, for example.

What is claimed is:

1. An information processing apparatus comprising:
one or more processors;
a memory coupled to the one or more processors and storing a program, wherein
the program, when executed by the one or more processors, causes the one or more processors to perform:
acquiring an input image to output a first image and a second image;
extracting first characteristic point information from the first image;
generating a third image obtained by reducing a data amount of the second image;
extracting second characteristic point information from the third image;
deriving a difference between the first characteristic point information and the second characteristic point information; and
outputting the third image that is corrected in accordance with the difference, as an output image, and
when it is determined based on the difference that a part of the first characteristic point information is lost in the second characteristic point information, the third image corrected is output so that the second characteristic point information includes information corresponding to the lost part of the first characteristic point information in accordance with the difference as the output image.

2. The information processing apparatus according to claim 1, wherein the generating comprises generating the third image obtained by reducing a bit depth of the second image from a current bit depth.

3. The information processing apparatus according to claim 1, wherein:
the executed program further causes the one or more processors to perform correcting the second image or the third image in accordance with the difference, and
the third image obtained by reducing a data amount of the second image corrected by the correcting or the third image corrected by the correcting is output.

4. The information processing apparatus according to claim 3, wherein
the extracting the first characteristic point includes extracting, for each of a plurality of pixels included in the first image, a change ratio of a pixel value with respect to a surrounding pixel, as the first characteristic point information,
the extracting the second characteristic point includes extracting, for each of a plurality of pixels forming the third image, a change ratio of a pixel value with respect to a surrounding pixel, as the second characteristic point information,
the driving includes deriving the difference for each pixel of the third image corresponding to the first image, and
the correcting includes correcting a pixel value of the second image or the third image for each pixel in accordance with the difference.

5. The information processing apparatus according to claim 3, wherein the correcting includes correcting a pixel value of a pixel the difference of which is a first threshold or more among a plurality of pixels included in the second image or the third image.

6. The information processing apparatus according to claim 5, wherein the correcting includes:
correcting a pixel value of a pixel, the difference of which is the first threshold or more and a brightness of which is a first brightness or more among the plurality of pixels included in the second image or the third image, to be less than the first brightness; and
correcting a pixel value of a pixel, the difference of which is the first threshold or more and the brightness of which is less than the first brightness among the pixels included in the second image or the third image, to be the first brightness or more.

7. The information processing apparatus according to claim 5, wherein the outputting includes outputting the output image to a learning unit configured to output processing result information according to the output image to be input, the output image being the third image the pixel value of which has been corrected and that includes a pixel the difference of which is less than the first threshold.

8. The information processing apparatus according to claim 5, wherein:
the deriving includes outputting, to the first output control module, an output target instruction configured to set a pixel the difference of which is less than the first threshold among the plurality of pixels included in the third image as an output target, and
the outputting includes outputting the third image to the learning unit as the output image when receiving the output target instruction for all the pixels forming the third image.

9. The information processing apparatus according to claim 1, wherein the executed program further causes the one or more processors to perform outputting the first image to a display unit.

10. The information processing apparatus according to claim 1, wherein:
the executed program further causes the one or more processors to perform expanding a histogram of brightness of the second image, and
the generating incudes generating the third image obtained by reducing a data amount of an expanded image, the expanded image being the second image having been expanded.

11. The information processing apparatus according to claim 1, wherein:
the executed program further causes the one or more processors to perform clarifying the first image, and
the extracting includes extracting the first characteristic point information from a display image being the first image having been clarified.

12. The information processing apparatus according to claim 1, wherein:
the executed program further causes the one or more processors to perform:
acquiring a first distance image specifying distance information for each of a plurality of detection points included in a photographing environment of the input image; and
extracting third characteristic point information from the first distance image, and
the deriving includes deriving the difference between the second characteristic point information and fourth characteristic point information, the fourth characteristic point information being generated based on a result of an OR operation of the first characteristic point information and the third characteristic point information.

13. The information processing apparatus according to claim 12, wherein:
the executed program further causes the one or more processors to perform the OR operation, and
the performing the OR operation includes correcting the first characteristic point information based on the result of the OR operation to generate the fourth characteristic point information.

14. The information processing apparatus according to claim 12, wherein the first distance image specifying distance information is acquired from a first sensor for each of the plurality of detection points.

15. The information processing apparatus according to claim 1, wherein:
the executed program further causes the one or more processors to perform:
acquiring a direction information indicating a direction of an object included in a photographing environment of the input image; and
increasing a data amount of an object area in accordance with the direction information, the object area being an area, in which the object is present, indicated by the direction information in an entire area of the second image, and
the generating includes generating the third image obtained by reducing a data amount of the second image with an increased data amount of the object area.

16. The information processing apparatus according to claim 15, wherein the direction information indicating at least a direction of the object is acquired from a second sensor and a distance from the object to the second sensor.

17. The information processing apparatus according to claim 1, wherein:
the executed program further causes the one or more processors to perform:
acquiring a first distance image specifying distance information for each of a plurality of detection points included in a photographing environment of the input image;
acquiring direction information indicating a direction of an object included in the photographing environment of the input image;
generating a second distance image obtained by increasing a change ratio of the distance information of the detection point within an object area with respect to another surrounding detection point, the object area being an area, in which the object is present, indicated by the direction information in an entire area of the first distance image; and
extracting fifth characteristic point information from the second distance image, and
the deriving includes deriving the difference between the second characteristic point information and sixth characteristic point information, the sixth characteristic point information being generated based on a result of an OR operation of the first characteristic point information and the fifth characteristic point information.

18. The information processing apparatus according to claim 17, wherein
the executed program further causes the one or more processors to perform the OR operation, and
the performing the OR operation includes correcting the first characteristic point information based on the result of the OR operation to generate the sixth characteristic point information.

19. The information processing apparatus according to claim 17, wherein:
the first distance image specifying distance information is acquired from a first sensor for each of the plurality of detection points, and
the direction information indicating at least a direction of the object is acquired from a second sensor and a distance from the object to the second sensor.

20. An information processing apparatus including a processor, the processor being configured to execute processing comprising:
acquiring an input image to output a first image and a second image;
extracting first characteristic point information from the first image;
generating a third image obtained by reducing a data amount of the second image;
extracting second characteristic point information from the third image;
deriving a difference between the first characteristic point information and the second characteristic point information; and
outputting the third image corrected in accordance with the difference as an output image, and
when it is determined based on the difference that a part of the first characteristic point information is lost in the second characteristic point information, the third image corrected is output so that the second characteristic point information includes information corresponding to the lost part of the first characteristic point information in accordance with the difference as the output image.

21. An information processing method executed by a computer, the method comprising:
acquiring an input image to output a first image and a second image;
extracting first characteristic point information from the first image;
generating a third image obtained by reducing a data amount of the second image;
extracting second characteristic point information from the third image;
deriving a difference between the first characteristic point information and the second characteristic point information; and
outputting the third image corrected in accordance with the difference as an output image,
when it is determined based on the difference that a part of the first characteristic point information is lost in the second characteristic point information, the third image corrected is output so that the second characteristic point information includes information corresponding to the lost part of the first characteristic point information in accordance with the difference as the output image.

* * * * *